Jan. 31, 1967    E. J. RASER ET AL    3,302,186
INFORMATION RETRIEVAL SYSTEM
Original Filed Aug. 22, 1960    6 Sheets-Sheet
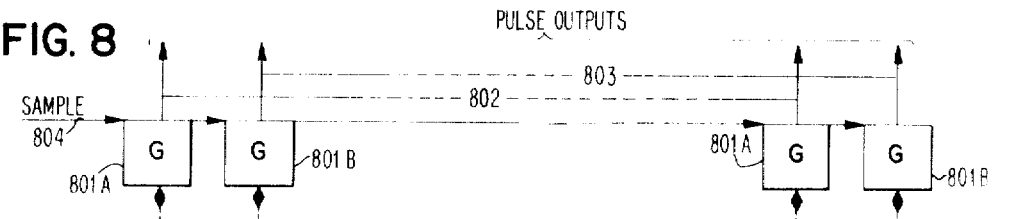
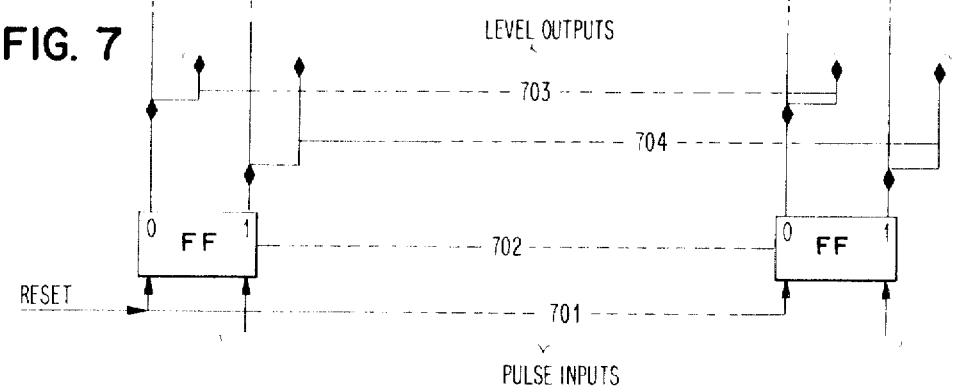
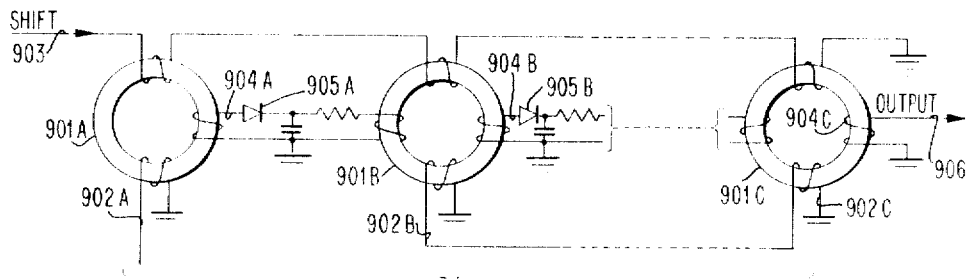
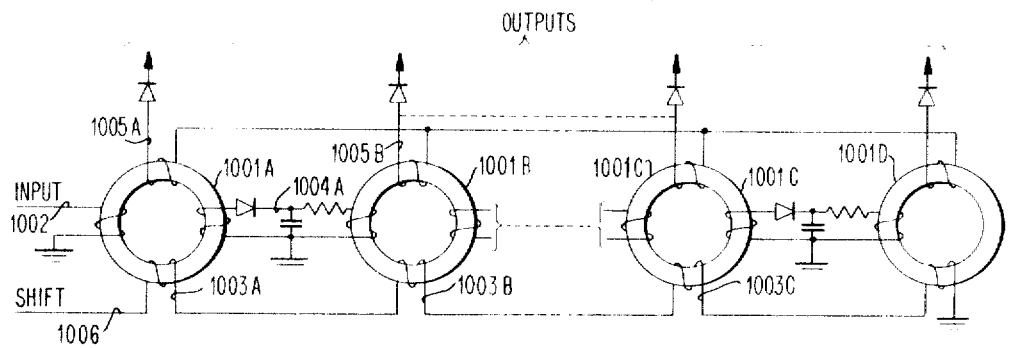

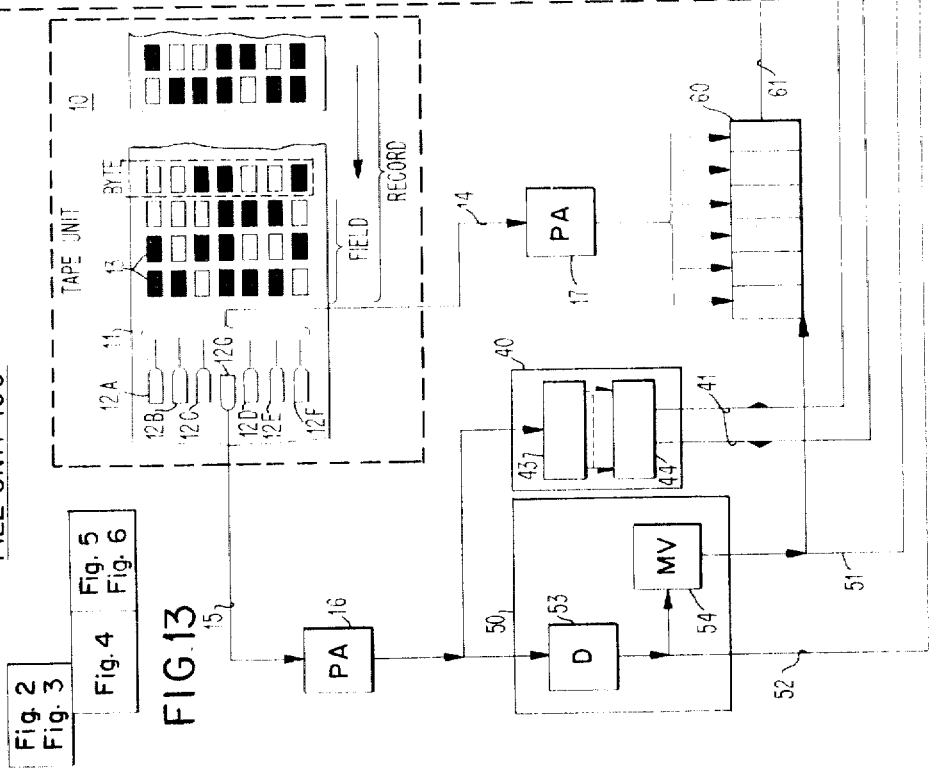

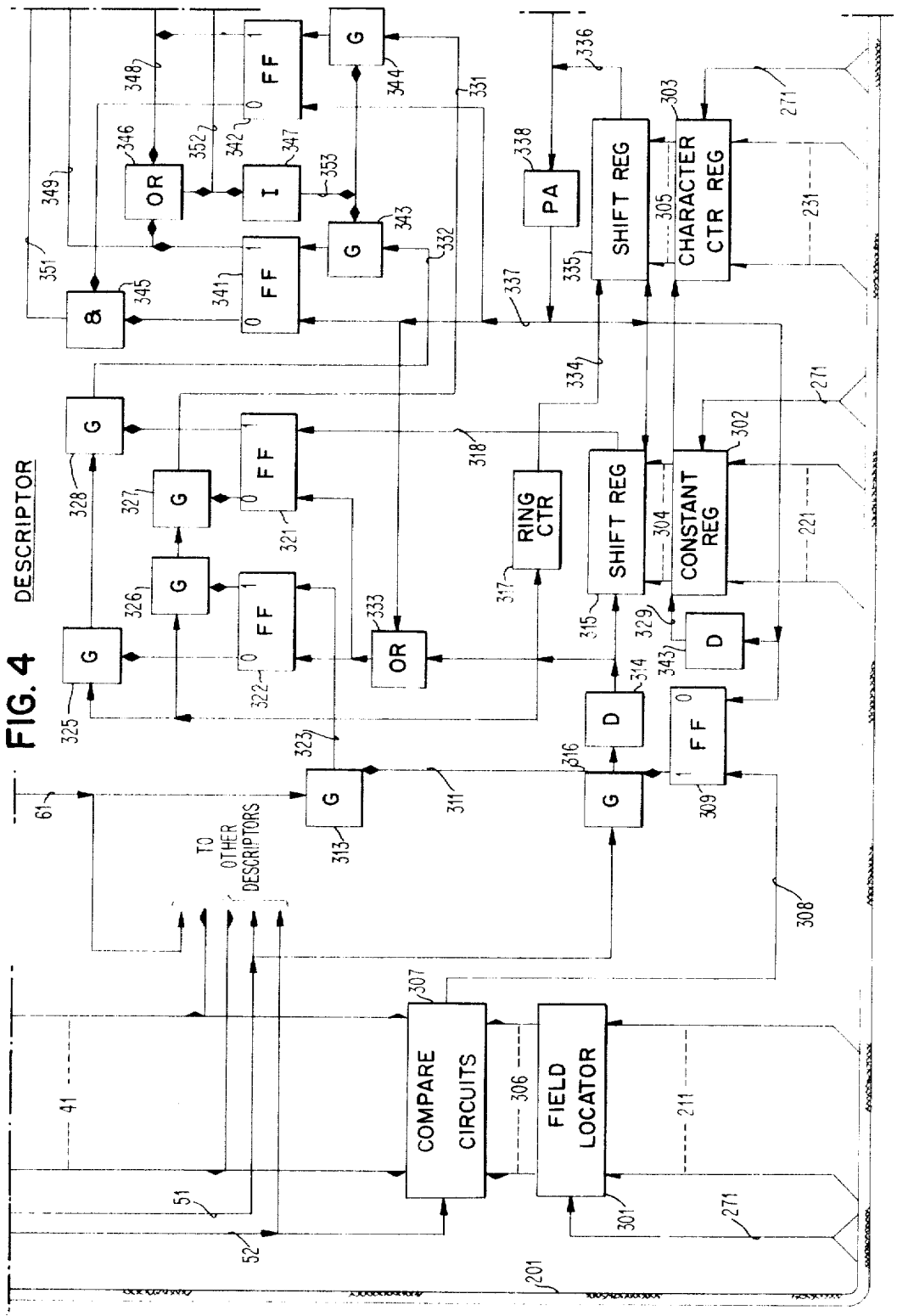

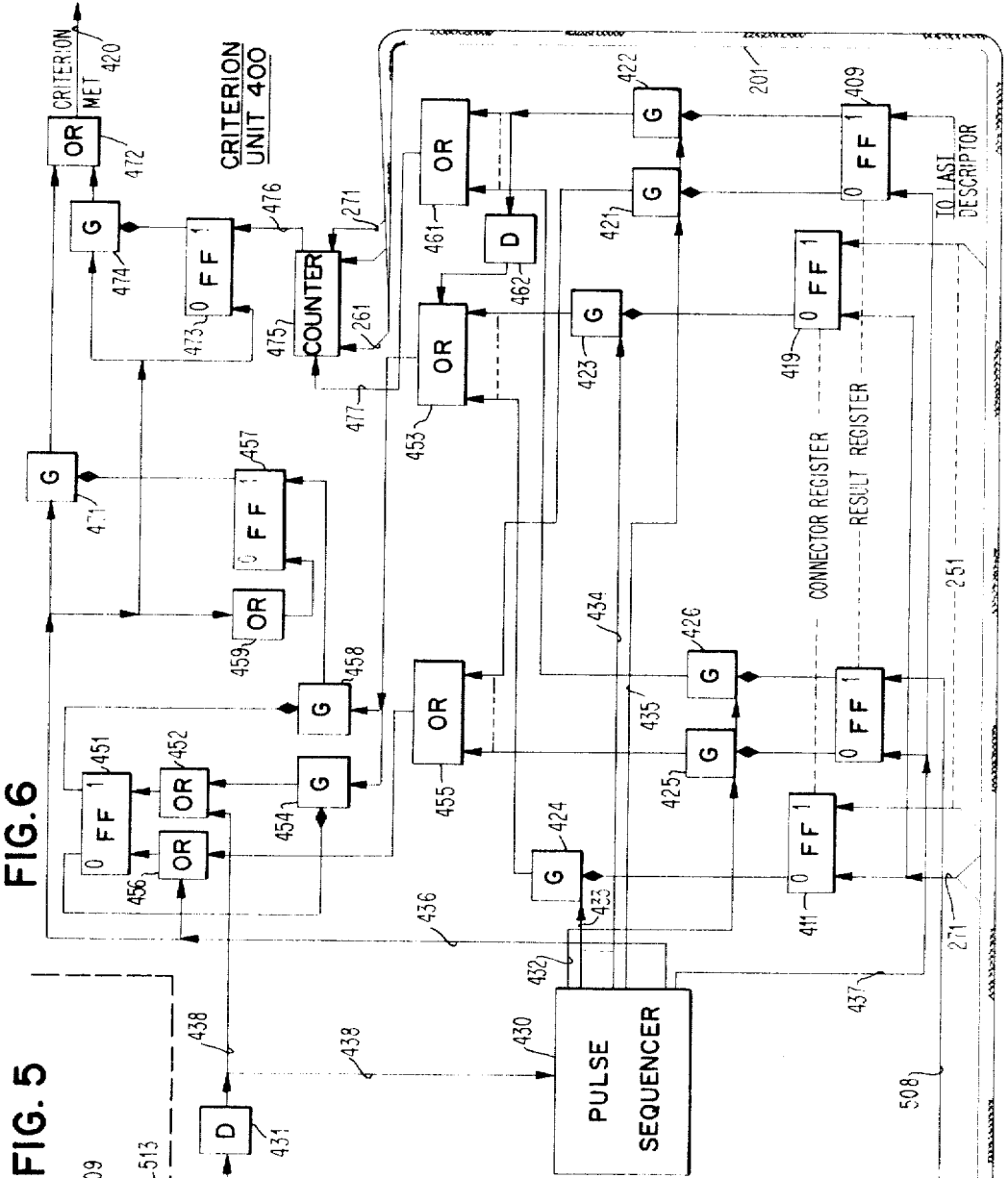

United States Patent Office 3,302,186
Patented Jan. 31, 1967

---

3,302,186
INFORMATION RETRIEVAL SYSTEM
Edward John Raser, Montgomery County, Md., and Alexander S. Lett, Putnam County, N.Y., assignors to International Business Machines Corporation, New York, N.Y., a corporation of New York
Continuation of application Ser. No. 51,196, Aug. 22, 1960. This application Aug. 17, 1964, Ser. No. 391,357
31 Claims. (Cl. 340—172.5)

This application is a continuation of the formerly co-pending but now abandoned application of Edward John Raser and Alexander S. Lett, Serial Number 51,196, filed August 22, 1960, entitled, "Information Retrieval System" and assigned to the same assignee as the present application.

The present invention is directed to a system for selectively retrieving information or records from a file memory, and more particularly to a system for retrieving only those records having information in a selected field or fields which meet specified criteria.

In the past, there have been retrieval systems capable of fetching information words from locations in a file and further capable of comparing such retrieved information to a fixed, standard message. It is traditional for such systems to make a logical test of the results of this comparing operation, and to use the test results for directing other apparatus which is useful to dispose of the retrieved and evaluated information. In this way, the compared words or records taken from the file which satisfy a criterion established by the fixed word and test means may be directed into signal utilizing or storage device for immediate or later use.

Such a conventional system has the disadvantage that the comparison made during each pass through a file is limited to the entire word or a single field or group of information bits thereof, so that in order to test records in file for multiple criteria, it may be necessary to make as many passes of data through the comparing apparatus as there are criteria. Further, in such conventional apparatus, the establishment of logical AND and OR (i.e., necessary and sufficient condition) relationships between the comparison results can be accomplished only by the use of complicated, post-comparing processes.

Further, while known information retrieval systems have used serial comparison between each bit of a criterion word and a corresponding bit within a word or word-field retrieved from memory, in the manner used in apparatus forming the preferred embodiment of the invention hereinafter described, such systems traditionally are slow to the point where a file, using a traditional storage element such as a tape, a drum, or punched cards, is capable of reading out records faster than they can be processed within the comparing apparatus. This requires the file scanning operation to be interrupted frequently.

Accordingly, it is an object of this invention to provide a new and improved information retrieval system.

Another object of this invention is to provide a new and improved high speed information retrieval system.

Another object of this invention is to provide a new and improved information retrieval system capable of searching the records within a file, such as a drum or tape, at normal readout speed of that file without interrupting the readout operation.

Another object of this invention is to provide a new and improved information retrieval system capable of separately examining multiple fields within each record fetched from a file.

Another object of this invention is to provide a new and improved information retrieval system capable of separately examining multiple fields of each record within a file and further capable of performing logical tests on the results of such separate examination of each record within records retrieved from storage.

Another object of this invention is to provide a new and improved information retrieval system to test each of selected fields for satisfaction of a criterion, and use the test results so obtained to determine whether combined test results meet necessary and conditional relationships in an over-all criterion for each record.

Another object of this invention is to provide a new and improved system for testing for the existence of logical relationships, such as necessary or sufficient conditions, among groups of event-indicating signals.

Briefly, the information retrieval system constituting the present invention is practiced in conjunction with a file of any of a number of well-known types in which a plurality of records previously have been stored. Such records have standard format, with like classes of information recorded in various corresponding fields of the various records. The file also has means for sequentially reading out, i.e., translating, to a file output such records in the form of successive fields of time-sequential significant signals or bits.

To work with such a file, there is provided a plurality of devices, hereinafter referred to as descriptors, each of which is capable of receiving record bits from the file. Accordingly, each descriptor includes gating means for coupling the file output to field evaluating means within each such descriptor. Each such gating means is operative to deconditioned and conditioned states to block and admit, respectively, the passage of bits therethrough. There is provided means individual to each descriptor operative for comparing field-identity signals transmitted from the file against a field of fixed signals previously written into that descriptor, and for placing the aforementioned one of the gating means in conditioned state when identity is established between the received field identifying bits and the bits of fixed field identity words. Accordingly, the bits within the field of each record which follows the establishment of such an identity are admitted to the appropriate descriptors. The above-mentioned evaluating means within each descriptor includes another comparing means which is operative to compare the bits admitted to that descriptor with a message recorded or fixed prior to the operation of the file within that descriptor. Within each descriptor, means including the second comparing means are effective for producing a result signal in accordance with a criterion previously established for that descriptor unit. For instance, the result means may be operative for producing an output signal only in the event that the field or fields evaluated within the descriptor satisfy such conditions as equal to, not equal to, greater than, and less than relationships with respect to the fixed word. Within each such descriptor, there also is provided counting means operative for deconditioning the aforesaid gating means of that descriptor upon the admission to that descriptor of the number of bits contained in the field or fields to be evaluated by the descriptor. By the use of the above-described apparatus, a particular field can be admitted together with other, adjacent fields of each record to any descriptor for evaluation. Thus, the term descriptor as used in connection with this invention is symbolic of a device comprising a series of electronic components which cooperate to select a portion or portions of a file output for evaluating whether or not such portions meet predetermined criteria with preselected but changeable signals being written into such components prior to file operation to indicate the file portion to be selected and the predetermined criteria.

Common to the above-mentioned descriptors, there is provided settable result register means having elements individually coupled to and operative to generate signals in accordance with the results yielded by the test result means of the various descriptors. There also is provided settable connector register means for directively establishing logical relationships, such as AND or OR conditions, between event expressing signals produced between result register means elements. The result register means and the connector register means are coupled to and effective for controlling means for producing a "criterion-met" signal. The latter means is operative to produce such a signal in response to the presence of result or "criterion-met" signals derived from the individual descriptors which satisfy an expression controlled by the logical connective signals.

Accordingly, the result register means and the connector register means are coupled to apparatus for testing the results expressed by the states of the various result register elements for the existence of a logical relationship expressed by the states of the connector register means elements. The last-named apparatus is effective for determining whether or not there exists an overall satisfaction of multiple criteria against which retrieved records are compared, and is operative to generate a "criterion-met" signal for each of those records fetched from the file which meets the multiple criteria. Such a "criterion-met" signal may be used to directively control means for disposing of all records fetched from the file.

By the use of the above-described apparatus, it is to be seen that particular fields of each record in the file can be compared to criteria individually expressed in terms of fixed words registered within each of the various descriptors. Further, the results of the field comparisons accomplished in each such descriptor for each file record can be combined logically with the results of similar comparison operations performed in other descriptors on fields of the same record. The combined logical result comparison operation is used to directively dispose of all file records in the order in which they are examined. For instance, the "criterion-met" signal mentioned above can be used to direct the admission of a criterion-satisfying record into another, record utilizing apparatus associated with the file. By the use of this invention, a record within a file containing information in its various fields which satisfies a group of relationships expressed prior to the initiation of the search of the file can be directively disposed of during the course of fetching all records from the file into the comparing apparatus.

Another aspect of the present invention is directed to the part of the above-mentioned apparatus used for effecting the logical combination of the result signals yielded by the above-mentioned descriptors. In order to effect a logical test of the existing interrelationship among the result signals provided by each descriptor, or, for that matter, any series of devices capable of producing binary signals expressing the existence of independently occurring events, there are provided first and second pluralities of sources, such as gates, arranged in interleaved fashion. Each such source may be conditioned and therewith made operative in response to the application of a signal to its sample input for producing an output signal. Each of the sources of the first series expresses in binary form a signal representing an independently occurring event, while each source of the second series expresses in binary form a signal representing the logical relationship between two such events.

In terms of the above-described apparatus, each first series source may be used as a source of signals to represent a "criterion-not-met" condition for fields of records evaluated within an individual descriptor, while each second series source may be used as a source of signals to indicate the existence of an OR condition between two, next adjacent series sources. The absence of such a second series source signal is regarded as indicating the existence of an AND condition between two such adjacent first series sources.

In order to cause the first and second series sources to generate signals, there is provided scanning means having a plurality of outputs individually connected to the sample inputs of the various sources. The scanning means is operative to apply such signals first to a first series source and then to the corresponding second series source throughout the lengths of the interleaved series.

In order to supply a useful signal to a system output, there is provided a generator operative upon the completion of the scanning operation for producing such a signal. Control means coupled between the generator and the system output is operable to conditioned and deconditioned states for admitting and blocking, respectively, the passage of signals therethrough. This control means is in turn controlled by means having first and second inputs coupled to the outputs of the various first and second series sources, respectively. The last-named means is operative in accordance with the order of application of signals to its first and second inputs for selectively conditioning and deconditioning the control means. In terms of the descriptor equipment, the independently occurring events which cause the first series sources to be conditioned and deconditioned allow a signal to be delivered to the system output upon the satisfaction of multiple criteria among those events.

The foregoing and other objects, features and advantages of the invention will be apparent from the following more particular description of a preferred embodiment of the invention, as illustrated in the accompanying drawings.

FIG. 2 shows in block schematic form a file unit.

FIG. 3 shows in block schematic form a descriptor register unit.

FIGS. 4 and 5 show in logic schematic form a diagram of a descriptor.

FIG. 6 shows in logic schematic form a criterion unit.

FIGS. 7 and 8 show schematic diagrams of a register and a gate controlled output circuit for that register, respectively.

FIG. 9 shows a schematic diagram of a core type shift register.

FIG. 10 shows a schematic diagram of a core type sequential pulse generator.

FIG. 13 shows the order in which FIGS. 2, 3, 4, 5, and 6 are to be arrayed.

Figure 1:
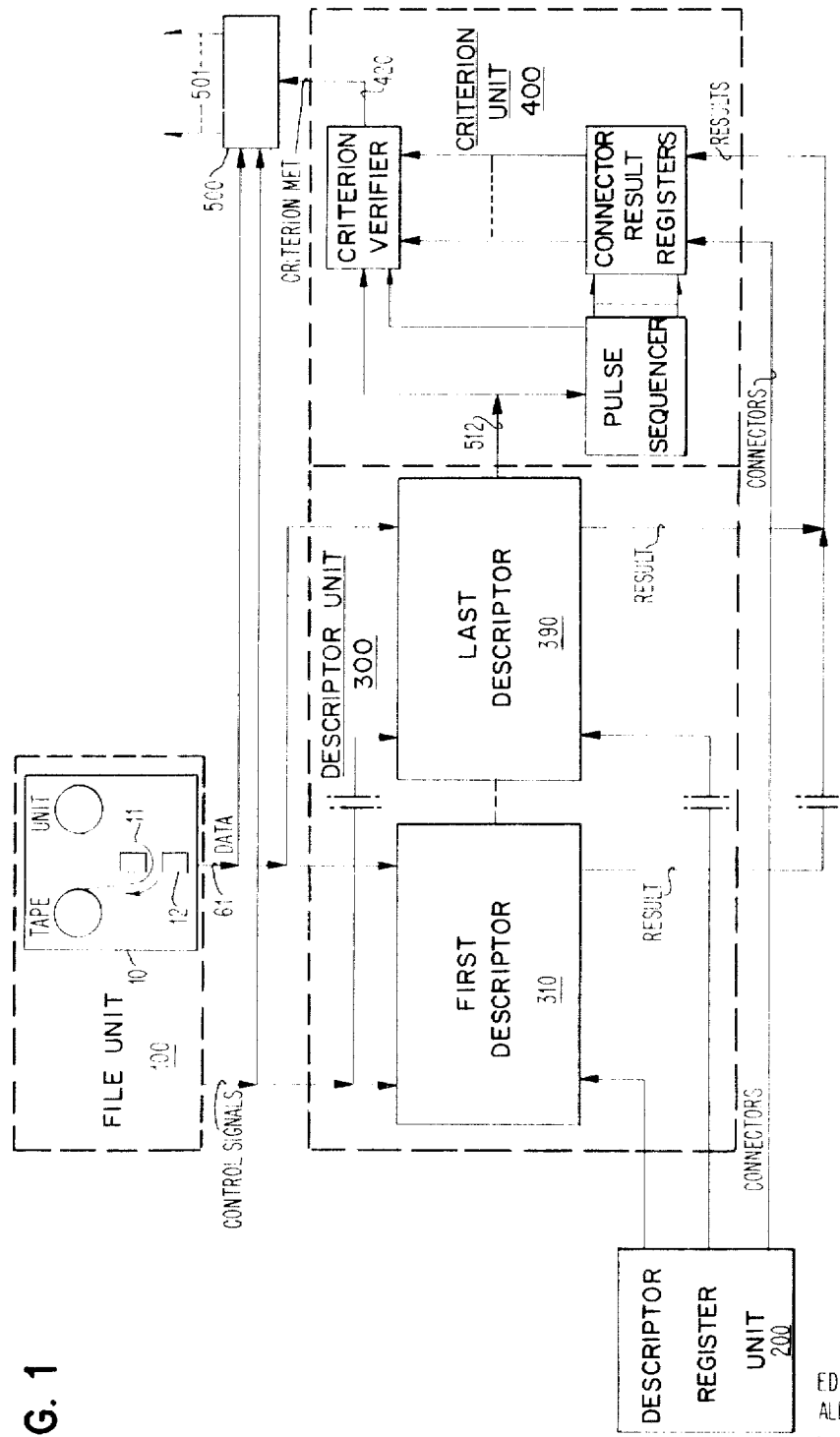
FIG. 1 shows a block schematic diagram of an information retrieval system.

Throughout the following description and in the accompanying drawings there are certain conventions employed which are familiar to those skilled in the art. Additional information concerning these conventions is as follows:

In the drawings, a convention, solid arrowhead is employed to indicate (1) a circuit connection, (2) energization with standard pulses, and (3) the direction of pulse travel which also indicates the direction of control. A solid, diamond-shaped arrowhead indicates (1) a circuit connection and (2) energization with a D.C. level. The input and output lines of the block symbols are connected to the most convenient side of the block. An input connected to a corner of a first block symbol may be continued along an edge of that block to a point on an adjacent block symbol, in order to illustrate the fact that the inputs of such blocks are intended to be energized in parallel from a common source. Bold-face character symbols appearing within a block symbol identify the common name of the circuit or element represented. For instance, FF indicates a flip-flop, G a gate, AND a logical AND circuit, OR a logical OR circuit, and so on. Note that gates identified by the symbol G in the drawings are circuits which permit pulses to pass therethrough when "gated" by a relatively steady-state input signal whereas AND circuits are operative to produce an output in the presence of two or more steady-state input signals. This notation is in accordance with that suggested in Digital Computer Components and Circuits by Dr. R. K. Richards (D. Van Nostrand Co., Princeton, N. J., 1957) at page 55.

The flip-flops, gates, and OR circuits referred to in the following description may be of any suitable type, but preferably are of the type shown and described in formerly copending application Serial No. 824,105, filed June 30, 1959, by Charles J. Tilton, and entitled "Asynchronous Multiplier," now United States Patent 3,085,747, and assigned to the same assignee as the present invention. The delay units and pulse amplifiers indicated in the drawings by the letters D and PA, respectively, also may be of any suitable type, but preferably are of the same general construction as shown in formerly copending application Serial No. 818,896, filed June 8, 1959, Donald J. Hinkein et al., entitled "Control Element for Computing Devices," now United States Patent 3,067,937, and assigned to the same assignee as the present invention.

DESCRIPTION OF THE FILE

The apparatus forming the preferred embodiment of this invention is made to function with a record-storing file unit 100. It is to be understood that while a file suited to operate with the present invention may take any of a number of well-known and accepted forms, the form selected for the purpose of describing the present invention is a magnetic tape file of the type well understood by those skilled in the art. This file, per se, does not form a part of the present invention, so that a detailed description of its operation is not necessary to an understanding of the present invention. Consequently, the description of file unit 100 which follows is confined to general terms.

The relationship of file unit 100 to the rest of the apparatus is generally indicated in FIG. 1 and is shown in greater detail in FIGS. 2, 4, and 5. Referring to FIG. 1, file unit 100 includes tape unit 10. Unit 10 has a motor means (not shown) for driving magnetic tape 11 in the direction indicated by the arrow past multiple reading heads collectively indicated as 12 in FIG. 1. Records have been recorded on tape 11 and are read or sensed by heads 12 in the manner next set forth.

Referring to FIG. 2, a length of tape 11 is shown in its relationship to the aforementioned read heads 12, which are individually shown as 12a–12g in FIG. 2. Heads 12a–12g are spaced apart from each other and arranged in a line across the width of tape 11. The magnetic material in tape 11 originally has been magnetized in a single, arbitrarily selected direction. In the above-mentioned recording process, specific areas of tape 11, such as those indicated as 13, are used to represent significant information in binary form. Information reduced to binary bits has been recorded on tape 11 by selectively reversing the common direction of magnetization of the particular ones of areas 13 which represent a binary 1. Such binary 1 bit areas are represented in FIG. 2 by being darkened. Heads 12a–12g are oriented with respect to tape 11 so that the corresponding bit within each column or byte of area 13 recorded on tape 11 is passed under a particular one of heads 12a–12g. In this way, an impulse is induced in one of these read heads each time a darkened one of areas 13 is passed under that head, and the head is said to "sense" the channel of bits defined in this manner. It is pointed out that the channels sensed by heads 12a–12f are used to store informational bits, while each area 13 of the channel sensed by head 12g has a 1 recorded therein. The impulses produced in head 12g as tape 11 is moved are used as sync bits, i.e., to mark the passage of a byte past heads 12a–12f.

As indicated in FIG. 2, a single record in a tape comprises a fixed number of columns or bytes of areas 13. Adjacent bytes within a record may be grouped together to form a field or subgroup of information within a record, the number of bytes in a particular field depending upon the number of bits necessary to describe the data to be stored within that field. Within each fixed format record, a particular field in any record on tape 11 comprises the same number of bytes occupying the same position within that record as those occupied by corresponding fields in all other records on tape 11. From this it is to be seen that the location, particularly the beginning, of the location, of a particular field in any record can be determined from a count of the number of impulses applied to conductor 15 from the beginning of the record as that record is sensed by heads 12a–12g.

In order to convey information and control signals over conductors collectively indicated as 14 and 15, respectively, from the file unit 100 to other apparatus as shown in FIG. 2, there is provided field counter 40 and time pulse generator 50. The use of these devices is explained next.

In order to provide field-indicating signals, conductor 15 conveys impulses from head 12g to the inputs of field counter 40 and the pulse generator 50 via pulse amplifier 16. Field counter 40 includes counter 43 and decoding matrix 44. For purposes of simplifying the present description, the modulus of counter 43 is equal to the number of bytes in each record. The output of head 12g is coupled to the input of counter 43 and to the inputs of decoding matrix 44 by pulse amplifier 16. Matrix 44, driven by counter 43, is operative for producing multiple output conductors indicated collectively as 41, combinations of levels (i.e., D.C. signals) in accordance with the identity of the field currently being sensed by read heads 12a–12f. Restated, matrix 44 of field counter 40 is effective to produce on output conductors 41 a combination of D.C. levels which represent the identity of the record field currently being sensed by heads 12a–12f, the combination of levels being changed each time the start of a new record field is passed under heads 12a–12f. With this arrangement, it is to be seen that each time counter 43 in field counter 40 has been advanced to register the number of input conductor 15 impulses measured from the beginning of each record, a new and unique combination of levels is placed on the various output conductors 41 of field counter 40. Further, at the end of each record, i.e., when the last record byte has passed under heads 12a–12g, counter 43 is prepared to drive the outputs 41 to the first-field indicating combination upon sensing the first impulse on conductor 15 supplied from the next succeeding record on tape 11.

Turning to time pulse generator 50 shown in FIG. 2, generator 50 includes delay unit 53 having an input coupled to pulse amplifier 16 and an output coupled to multivibrator 54. Multivibrator 54 is operative for producing impulses on its output conductor 51 at a rate equal to the rate at which impulses are supplied on input conductor 15 times the number of information bit channels on tape 11. Multivibrator 54 is synchronized by the aforementioned signals received from the output of delay unit 53, so that by proper choice of delay unit 53, impulses are produced by multivibrator 54 on output conductor 51 at times which fall between the sensing times of adjacent bytes on tape 11. Output conductor 51 is coupled to the shifting input of shift register 60 and to other apparatus external to file unit 100 for purposes described in other sections of this description. The output of delay unit 53 also is coupled to output conductor 52 for distribution to other, later-described apparatus.

From the preceding paragraphs, it is to be seen that the information bits of each byte in a record are read or sensed in parallel by heads 12a–12f of tape unit 10. In order to change the order of sensed impulses of the various bytes from the parallel, byte form in which they are sensed, to serial order, shift register 60 is included in file unit 100. The function of register 60 is described next in terms of its relationship to other apparatus within file unit 100. The number of stages in shift register 60 is equal to the number of information-bit sensing heads 12a–12f. The output of each of read heads 12a–12f is coupled to the signal input of a particular one of the stages of shift register 60 by conductors collectively indicated as 14 via pulse amplifiers collectively indicated as 17 in FIG. 2. With this arrangement of elements, it is to be seen that information bits of each byte sensed by heads 12a–12f first are moved into the stages of register 60 and then are shifted in serial order into shift register 60 output conductor 61 as impulses are received from multivibrator 54 over conductor 51. Further, the byte order in which information has been recorded on tape 11 and the connections effected by conductors 42 are such that the message bits order of any records translated from tape 11 is from most to least significant in reference to the passage of time. Also, it is to be seen that the serialized impulses on conductor 61 derived from adjacent bytes of any record on tape 11 are non-overlapping and are substantially uniformly spaced-apart in time from each other.

In summary, it is to be seen that file 100 includes apparatus capable of converting the digital information contained in each record stored on tape 11 into time sequential, serially related impulses on output 61; further, for each time position of each information bit on output conductor 61, there is an impulse produced on output conductor 51. File 100 also produces on conductor 52 an impulse corresponding to the start of each byte of impulses sent out over output conductor 61 and produces on output conductors 41 a combination of levels to indicate which field of a record on tape 11 currently is being sensed by read heads 12a–12f.

COMPARISON APPARATUS

*General description.*—Referring to FIG. 1, there is provided to work in conjunction with file unit 100, a descriptor unit 300 which has therein a plurality of descriptors such as 310–390. In advance of each search of file unit 100, each descriptor, such as 310, is selected for use in evaluating the information contained within a particular field or adjacent fields of the various records stored within file unit 100. Accordingly, the information bits appearing serially in the above-described manner on output conductor 61 of file unit 100 derived from the various fields on tape 11 which are to be examined are directed by later described means into the appropriate descriptor units for comparison against a fixed message or criterion which is individually established with each such descriptor. The criteria or fixed messages also must be established within each descriptor in advance of the file search operation. The output bits appearing on conductor 61 also are directed into storage means such as shift register 500 where the bits of each record from file 100 undergoing evaluation within descriptor unit 300 are held until descriptor unit 300 and criterion unit 400 have performed their laterdescribed comparing and logical decision operations, respectively. After tests for multiple criteria have been performed in units 300 and 400, unit 400 produces a "criterion-met" signal on its output conductor 420 in the event that the multiple criteria against which each record is compared are satisfied, i.e., there exists in the record stored in register 500 necessary and sufficient relationships which satisfies information within the evaluated fields to which the search is directed. Such a signal on conductor 420 may be used to read the stored, criteriasatisfying record in register 500 to other record storing or utilizing apparatus not shown. While the binary signals produced by file unit 100 are fed onto output conductor 61 in serial form, it is to be realized that such serialization of information bits is not necessarily the only form in which such information can be put into the apparatus forming the present invention. It will be readily apparent to those skilled in the art that the form in which such informational bits are presented is immaterial to the broader aspects of the present invention.

*Establishing criteria- and field-defining signals.*—Referring to FIG. 1, there is provided descriptor register 200 for putting data into each descriptor, such as 310, prior to a search of file 100. Descriptor register unit 200 provides: (1) signals for transmission to and storage within each of descriptors 310–390 which are to be used for identifying and selecting a particular field or fields of information bits from each record retrieved from tape unit 100; (2) signals defining a criterion or fixed message (including a character count) for transmission to and storage within each descriptor which are to be used as a standard against which field information will be compared; and (3) signals for transmission to and storage within criterion unit 400 which are to be used to establish a logical relationship between the result-indicating signal produced by any descriptor and similar signals produced by other descriptors within unit 300. Common to all of the abovementioned registers there is provided resetting means 270 (shown in FIG. 3) capable of delivering signals to units 300 and 400 to reset or clear storing means within those units.

While the apparatus within descriptor register 200 chosen for purposes of explaining the present invention is manually operable, it is to be understood that a descriptor register having the over-all capabilities described above can be made to operate without intervention by a human operator. For instance, a descriptor register, suitably modified with respect to the one described below, could be placed under the control of a stored program computer in order to supply field-identifying and criterion establishing information, as well as resetting signals, to descriptor unit 300 and criterion unit 400 as well as file 100. In other words, it is to be understood that the contemplated invention in its broader sense is intended to embrace such semi-automatically or automatically operated descriptor register apparatus.

Referring to FIG. 3, descriptor register unit 200 includes a plurality of groups of manually settable registers. Each such group, for instance 210, is individual to one of the above-mentioned descriptors; in this case, the one shown in FIGS. 4 and 5. Since the operation of each such register in each group is substantially identical to the operation of all other registers, except for such matters as the number of independently controlled outputs, descriptor register 210 has been selected for description here, it being understood that all other registers operate in substantially the same way.

Descriptor register 210 has a plurality of output conductors collectively indicated as 211 to which pulses for transmission to other parts of the apparatus are supplied. In order to generate one such pulse for each output 211 conductor, single shot pulse generators collectively indicated as 212 are provided. The output of each such single shot unit is coupled directly to a particular one of output conductors 211. In order to control the production of impulses by each single shot 212, the contacts of a manually operable switch 213 are placed in series with the input of the single shot, so that when the contacts of switch 213 are momentarily closed, single shot 212 produces a single impulse on the particular one of conductors 211 connected to the output of single shot 212. In this way, an operator may selectively cause to be produced impulses on a desired combination of output conductors 211.

The aforementioned resetting means 270 also includes single shot 272 which is effective in response to the momentary closing of manually operable switch 273 (connected to the single shot input) for producing a corresponding impulse on output conductor 271. The impulses applied to conductor 271 are distributed to the reset inputs of later-described registers within descriptor unit 300 and criterion unit 400 for the purpose of resetting those registers on anticipation of establishing a new set of criterion signals prior to search. While common, independently operable resetting means 270 has been shown, it will be recognized by those skilled in the art that other well-known resetting and control schemes for controlling the release of old information stored within units 300 and 400 could be incorporated in the presently-described apparatus without departing from the spirit of the present invention.

The use of the signals produced on the outputs of the various registers within any group is next described. While this description has been confined to those registers used for controlling apparatus in the FIG. 4 and FIG. 5 descriptor and only a part of the apparatus in criterion unit 400, it is to be understood that the other apparatus to be controlled by registers within descriptor register 200 functions in a fashion analagous to the one next set forth. The signals produced on output conductors 211 are used to represent the identity of a particular field within each record stored on the previously-described tape 11 and are to be compared within the FIG. 4 and 5 descriptor to combinations of signals appearing on the above-described conductor 41. Signals on output conductors 221 are used to describe a fixed word and are to be compared to data in specified fields of tape 11 as signals representing such data appear on conductor 61. Signals on conductors 231 are used as a binary representation of a number of characters, where each character comprises a fixed number of bits, i.e., the number of bits to be accepted within the FIG. 4 and FIG. 5 descriptors. Signals on conductors 241 are used to represent the high, low, equal, or not equal test to be applied to the comparison between the incoming word from file 100 and the fixed word stored in descriptor of FIGS. 4 and 5. Signals on conductors 251 are used to represent logical relationships between the result signal yielded by each comparison operation performed within the FIGS. 4 and 5 descriptor and a similar signal yielded by the next succeeding descriptor in unit 300.

As indicated in FIG. 3, the output conductors 211, 221, etc., of the various devices within descriptor register 200 are gathered into cable 201 and distributed to points within units 300 and 400 which are to be described presently. The exact uses of signals conveyed over such conductors are to be made apparent in later sections of this description.

*Field recognition within a descriptor.*—Referring to FIGS. 4 and 5, the above-described conductors 211 bearing field-identifying combinations of signals are connected to the 1 inputs of the various bistable elements of field locator register 301. At this point it is stated that the number of conductors 211 and the number of bistable elements in register 301 is equal to the number of conductors 41 which bear combinations of field identifying levels to all descriptors within unit 300 from file 100.

Assuming that all such bistable elements have been reset to 0 state prior to the receipt of the above-mentioned impulses from conductors 211, it is to be seen that pulses appearing on selected ones of conductors 211 cause the corresponding bistable elements in register 301 to be set to and maintained thereafter in the 1 state. As previously mentioned, the signals on conductors 211 represent to the descriptor shown in FIGS. 4 and 5 the identity of a particular field which is to be examined by that descriptor. Therefore, the resulting combination of levels appearing on register 301 output conductors 306 (which persist after the conductor 211 signals vanish) also express such field identity within the descriptor. The output levels appearing on conductors 306 are fed into the lower input of compare circuit 307. As explained in a previous section of this description which was directed to file 100, it is to be recalled that the binary levels representing the identity of field of a record on tape 11 currently being sensed in file 100 appears in signal form on conductors 41 outgoing from file 100. For purposes of simplicity of description, the coding systems of signals appearing on conductors 41 and 211 are chosen to be identical. As indicated in FIG. 4, conductors 41 are connected to the upper inputs of compare circuit 307. It is to be seen that as tape 11 within file 100 continues to advance, from each sensed record on the tape there is produced on conductors 41 a set of signals which exactly matches the signals produced on conductors 306. Compare circuit 307 is operative in the presence of such matching combinations of signals applied to its upper and lower inputs and to the application of a signal to its sample input (which is connected to conductor 52) for producing a pulse on output conductor 308. It also is to be recalled from the description of file 100 that a pulse is produced on conductor 52 each time a byte of signals stored on tape 11 is sampled and that the record-indicating signal combinations appearing on conductors 41 change substantially in coincidence with one such byte marking, conductor 52 signals. As a result of this configuration of apparatus having the above-described relationships, a pulse appearing on compare circuit 307 output conductor 308 is in substantial coincidence with the start of every field which the descriptor shown in FIGS. 4 and 5 is previously set to examine, and with the first bit time position of the information-bearing pulses of that record which are being translated by file 100 into serially-related impulses on file output conductor 61.

A field-start pulse appearing on conductor 308 is applied to the 1 input of flip-flop 309 to shift that flip-flop to its 1 state and therewith produce on output conductor 311 a continuing level. Output conductor 311 is coupled to the conditioning inputs of gates 312 and 313. The sample inputs of gates 312 and 313 are coupled to conductors 51 and 61, respectively. From the description of file 100, it is to be recalled that file 100 is effective for producing impulses on conductor 51 substantially in coincidence with each time position which may be occupied by a data bit pulse appearing on conductor 61.

It is to be seen that the conditioning of gates 312 and 313 in the above-described manner is effective to cause those gates to pass thereafter time bit position pulses appearing from conductor 51 and data bits appearing serially on conductor 61 to apparatus yet to be described. It is pointed out that such pulses continue to flow through gates 312 and 313 until gates 312 and 313 are deconditioned. The apparatus for achieving such control of gates 312 and 313 is later described. However, it now is pointed out that the gates are maintained conditioned to pass pulses until the field identified by field locator register as being intended for use within the descriptor of FIGS. 4 and 5 has been sensed by heads 12a–12f of file 100.

In summary, it is to be seen that compare circuit 307 under the control of field locator register 301 is effective for generating a pulse that is substantially coincident with the start of the field of each record retrieved from file 100 which is to be evaluated within the descriptor shown in FIGS. 4 and 5. It is to be understood that the start of any field for each record translated from tape 11 within file 100 can be recognized by any other descriptor, such as 390 of descriptor unit 300 in substantially the same manner as the one just described.

*Data comparison within a descriptor.*—From the above section describing the descriptor register 200, it is to be recalled (1) that the words against which a specified field of all records is to be compared within a particular descriptor are conveyed to that descriptor, such as the one shown in FIGS. 4 and 5 over conductors such as 221, and (2) that such words have been reduced to pulses on selected ones of those conductors 221. Referring to the descriptor shown in FIGS. 4 and 5, conductors 221 are coupled to the 1 inputs of a bistable element (not shown) which comprise constant register 302. Assuming that all such bistable elements previously have been reset to 0 state, it is to be seen that pulses appearing on the selected ones of conductors 221 cause the corresponding bistable elements in register 302 to be set and maintained thereafter in the 1 state. The resulting levels on the 1 outputs of such register 302 bistable devices are used to control output gates (also not shown) within register 302, the gates being individually connected to and conditionable from the 1 outputs of the various register 302 bistable elements. The sample inputs of the various register 302 gates are connected in parallel to reset and shift conductor 314 on which a pulse appears in a predictable manner. While the operation of apparatus for placing such a pulse on conductor 314 is hereinafter explained, for now it is assumed that such a pulse exists after the constant register 302 flip-flops have been set in the above-described manner. Under these circumstances, the conditioned ones of flip-flop 302 output gates produce impulses on a combination of conductors 304 which is a duplicate of the combination of conductors 221 which bore impulses to the inputs of constant register 302. Conductors 304 are coupled to the various signal inputs of shift register 315.

In this manner, a word stored in register 302 during the course of a search of file 100 can produce a like word in shift register 315 each time a pulse appears on conductor 314. Such words moved into register 315 are to be serially shifted out and compared, bit-for-bit, with words incoming from file 100 to the FIG. 4 and FIG. 5 descriptor in the manner described in the next several paragraphs.

In the description set forth above, it has been established that bit time position pulses are passed through now conditioned gate 312 beginning with the time that signals derived from the field in each tape 11 which is to be examined within the FIG. 4 and FIG. 5 descriptor are being sent over conductor 51. Such bit time position pulses are passed through delay unit 316 to the shift input of register 315 and to the inputs of ring counter 317.

The continuing application of the delayed, bit time position impulses to the shift input of register 315 is effective for causing bits of the fixed word temporarily stored within register 315 in the above-described manner to be read out in serial form onto conductor 318. Conductors 304 are connected to the signal inputs of shift register 315 in such a manner that a word transferred into shift register 315 is oriented so that its most significant bit is stored in the register element next adjacent to readout conductor 318 and the least significant bit of the word is stored in the element most remote from readout conductor 318. With this arrangement, it is to be seen that the order of bits read from shift register 315 onto conductor 318 advances with the passage of time from the most significant to the least significant bit in the fixed word. Further, it is to be seen that the sequential order in which the fixed word bits are read from register 315 onto conductor 318 is the same as the order of word bits read from file 100 and admitted to conductor 323 of the FIG. 4 and FIG. 5 descriptor. From the above description, it is to be seen that there is substantial time coincidence between any bit position of a word incoming from file 100 admitted to conductor 323 with the corresponding bit position in a fixed word read from register 315 onto conductor 318.

It is the object of the bit comparing apparatus whose operation is explained in the next several paragraphs and which includes flip-flops 321 and 322 as well as gates 325–328 to determine the first-existing difference, if any, between the bits of the word incoming to the FIG. 4 and FIG. 5 descriptor from file 100 and the fixed word as such fixed word is serially presented on conductor 318. It is to be seen that since the successive bits appearing on conductors 323 and 318 are of decreasing significance, such a first-existing difference is sufficient to determine whether the word incoming from file 100 is greater or less than the comparison word shifted out of register 355.

In the apparatus used with and forming the preferred embodiment of this invention, the various bits of data and control appearing on conductors throughout the apparatus, particularly conductors 323 and 318, are in binary form. In the system contemplated, a 0 is represented by an absence of a pulse in the time position considered, while a 1 is represented by the presence of a pulse in the time position considered.

With the configuration of apparatus shown in FIG. 4, flip-flops 321 and 322 are reset to 0 state at the start of any compare operation. While the manner in which these flip-flops are restored is explained later in this description, it is assumed for the present that such a resetting operation has taken place. Conductor 323 is coupled to the 1 input of flip-flop 322, so that a 1 or 0 bit incoming from file 100 which is admitted by gate 313 to conductor 323 either shifts flip-flop 322 to its 1 state or allows flip-flop 322 to remain in its 0 state, respectively. Similarly, conductor 318 is coupled to the 1 input of flip-flop 321 so that a 1 or a 0 bit appearing on conductor 318 either shifts flip-flop 321 to its 1 state or allows flip-flop 321 to remain in its 0 state, respectively.

As stated previously, at the time each bit of a field from file 100 is presented on conductor 323, a corresponding bit of the fixed, comparison word from shift register 315 is presented on conductor 318. With conductors 323 and 318 connected in the manner described above, it is apparent that coincident 1 bits on conductors 323 and 318 both flip-flops 322 and 321 to the 1 state. Similarly, coincident 0 bits on conductors 323 and 318 leave flip-flops 321 and 322 in 0 state. In contrast to such matching conditions, unlike, coincident bits on conductors 323 and 318 leave flip-flops 321 and 322 in unlike states to register an inequality between the value of the incoming field bit and the coincident fixed, comparison word bit. When flip-flops 322 and 321 are left in 1 and 0 states, respectively, from the above-explained order of presentation of field and fixed word bits to comparing flip-flops 321 and 322, it is to be seen that the value of the incoming field data from file 100 is greater than the comparison word read from register 315. In the case of the opposite inequality, i.e., when flip-flops 322 and 321 are left in 0 and 1 states, respectively, it is to be seen that the value of the field data introduced from file 100 is less than the fixed comparison word read from register 315.

After a bit on conductor 323 has been compared to its corresponding bit on conductor 318, it is necessary to reset both flip-flops 321 and 322 in anticipation of the next bit comparison operation to be carried out by those flip-flops. Accordingly, the same pulse from delay unit 316 (used in the previously described manner to sample output gates controlled by flip-flops 321 and 322) also is passed through OR circuit 333 to the 0 inputs of flip-flops 321 and 322 to restore both flip-flops to 0 state. The delay introduced by unit 316 is sufficient to allow flip-flops 321 and 322 to settle in the states in which the have been placed by pulses on conductors 318 and 323, but short enough to allow those flip-flops to be reset prior to the appearance of the next successive bits on conductors 323 and 318. The directive and resetting operation of comparison flip-flops 321 and 322 continues in this manner until the last of the bits of a particular record field has been admitted to the descriptor. The manner in which the admission of bits from conductor 61 to the descriptor is ended is to be described presently.

In order to generate difference-indicating signals, the conditioning inputs of various ones of gates 325–328 are connected to the 0 and 1 outputs of flip-flops 321 and 322. The sample inputs and outputs of gates 325 and 328 and gates 326 and 327 are connected into first and second series, respectively. The conditioning inputs of gates 325 and 328 are connected to the 0 and 1 outputs of flip-flops 322 and 321, respectively, so that those gates are conditioned at the same time only when flip-flop 322 is in 0 state and flip-flop 321 is in 1 state, i.e., when the value of the field data incoming from file 100 is less than the value of the word read from register 315. The conditioning inputs of gates 326 and 327 are connected to the 1 and 0 outputs of flip-flops 322 and 321, respectively, so that those gates are conditioned at the same time only when flip-flop 322 is in 1 state and flip-flop 321 is in 0 state, i.e., when the value of the field data incoming from file 100 is greater than the word read from shift register 315. In order to sample the gates of the above-identified first and second series, the same impulse from delay unit 316 used to reset flip-flops 321 and 322 in the above-described manner is applied to the sample inputs of gates 325 and 326. If such a sampling impulse finds both gates of either the above-identified first or second series conditioned, the pulse is transmitted through the gates of that seriees to conductors 332 and 331, respectively. It is pointed out that the above-described sampling operation is completed prior to the resetting of flip-flops 321 and 322 even though the sampling and resetting pulses are of common origin because the resetting of the flip-flops is delayed by the sum of the transmission time of the pulse through OR circuit 333 and the resolution time of the flip-flop.

In summary, it has been shown that a condition of equality between bits presented on conductors 318 and 323 is represented by the absence of a pulse on conductors 331 and 332 when gates 325–328 are sampled. It also has been shown that a pulse appearing on conductor 331 or 332 indicates that the value of the field data incoming from file 100 to the FIGS. 4 and 5 descriptor is greater or less than, respectively, the value of the word read from register 315. A difference indicating impulse on either of conductors 331 and 332 is applied to difference-registering apparatus in the manner next described.

*Producing a result signal.*—Each descriptor, such as the one shown in FIGS. 4 and 5, contains logical decision making apparatus including test register 501, decoder 502, and compare circuit 503. This decision making apparatus is responsive to the operation of the above-described comparing apparatus for producing a result signal or pulse on conductor 508 at an appropriate time if a criterion established for that descriptor has been satisfied by the field bits admitted to the descriptor. The absence of such a pulse or result signal on conductor 508 at the time in question indicates that the criterion established for that descriptor has not been satisfied. While the following description of the result signal producing apparatus is confined to the descriptor shown in FIGS. 4 and 5, it is to be understood that corresponding apparatus within the other descriptors within unit 300 functions in substantially the same way.

As explained in a subsequent section of this description, flip-flops 341 and 342 are reset to their 0 states prior to the start of the admission of a field of bits to the FIGS. 4 and 5 descriptor. Consequently, significant levels are produced on the 0 outputs and not on the 1 outputs of those flip-flops. The 0 outputs of flip-flops 341 and 342 are coupled to the inputs of AND circuit 345, so that circuit 345 normally produces a significant level on its output conductor 351. The 1 outputs of flip-flops 341 and 342 are coupled through OR circuit 346 to the input of inverter 347. In the normal condition (i.e., the absence of a significant level from the 1 outputs of flip-flops 341 and 342, and consequently on the input of inverter 347) inverter 347 is effective to produce a significant level on its output conductor 353. Output conductor 353 is coupled to the conditioning inputs of gates 343 and 344, so that those gates are conditioned in the above-described normal case. The sample inputs of gates 343 and 344 are coupled to the aforementioned conductors 331 and 332, so that the first pulse to appear on either of conductors 331 and 332 during the time that gates 343 and 344 are conditioned is passed by the appropriate one of those gates to the 1 input of flip-flop 341 and 342, respectively. Accordingly, that one of the flip-flops is shifted to its 1 state and produces a significant level on its 1 output. This significant level is passed over the appropriate one of conductors 349 and 348 through OR circuit 346 to the input of inverter 347. Inverter 347 therewith removes the significant level from conductors 353 and the conditioning inputs of gates 343 and 344. Gates 343 and 344 are therewith disabled from passing subsequent pulses appearing on conductors 331 and 332.

The setting of one of flip-flops 341 and 342 to its 1 state and the subsequent production of a significant level on one of output conductors 349 and 348, respectively, provides a continuing level on that conductor which indicates that the field bits admitted to the descriptor is less than or greater than, respectively, the fixed comparison word stored in constant register 302. Further, the level from conductor 348 or 349 is passed through OR circuit 346 to conductor 352 to indicate a condition of inequality between the field bits admitted to the descriptor and the fixed comparison word stored in register 302.

In the event that the bits incoming over conductor 61 and admitted to the FIGS. 4 and 5 descriptor are exactly the same as those stored in constant register 302, it is to be seen that flip-flops 341 and 342 remain in 0 state up to and including the time that the end of field pulse is produced in the above-described manner on conductor 336 because no impulse appears on either of conductors 331 and 332. Since the 0 outputs of flip-flops 341 and 342 (on which significant levels are produced in the word equality case) are coupled to the inputs of AND circuit 345, circuit 345 is effective to produce an equality indicating level on its output conductor 351.

Conductors 348, 349, 351 and 352 are individually coupled to the various first, or upper, set of inputs of compare circuit 503. In the event that the levels appearing on individual ones of the second, or lower, inputs of compare circuit 503 match the significant levels appearing on the upper inputs of the same circuit, circuit 503 is effective to pass the aforementioned end-of-field indicating pulse appearing via conductor 336 on the sample input of the compare circuit output conductor 508.

In order to render the descriptor including compare circuit 503 operative to provide a logically generated result signal relative to each of the fields of bits admitted to the descriptor, there is provided test register 501. Test register 501 includes a plurality of bistable elements having 1 inputs individually coupled to the various ones of conductors 241. In the manner described previously in connection with the setting of elements in constant register 302, the manual manipulation of appropriate switches of group 240 within descriptor register 200 prior to the start of the search of file unit 100 is effective to selectively produce impulses on particular combinations of conductors 241. As a result, corresponding, selected combinations of the bistable elements within register 501 are shifted into 1 state. The outputs 514 of register 501 are coupled to the inputs of decoder 502, the various combinations of significant levels on conductors 514 being effective for causing a level to be produced on conductor 504 or levels to be produced on conductor 507 and one of conductors 505 and 506 in accordance with the requirements of the logical test to be performed within the descriptor on each field of bits admitted thereto. As in the case of registers 302 and 303, such a test word is stored within register 501 until a reset signal is received from unit 200, so that the levels on the selected ones of conductors 504 through 507 continue while file unit 100 is being searched.

Specifically, register 501 and decoder 502 are effective to produce levels on conductors 504, 505, 506, and 507 which compare circuit 503 uses to compare against levels appearing on conductors 351, 349, 348, and 352, respectively. A significant level is directively produced in the above-described manner on conductor 504 when it is desired to produce a result signal on conductor 508 each time a field tested within the descriptor is equal to the bits contained in register 302. Similarly, significant levels are directively produced on conductor 507 (to indicate an inequality) and one of conductors 505 and 506 when it is desired to produce a result signal on conductor 508 each time a field admitted to the descriptor is greater or less than, respectively, the comparison word stored in register 302.

*Ending the admission of a word to a descriptor.*—From the previous description of file 100, it is to be recalled that a particular field includes a fixed number of bits serially produced on conductor 61. From the description of the FIGS. 4 and 5 descriptor thus far given, it also is to be recalled that the start of admission of bits to a descriptor is initiated by causing compare circuit 307 inputs 211 to match the beginning of the field to be examined within the descriptor from a combination of field-representing levels on conductors 41 to the combination of levels present on conductors 306. From the above description, it also is to be seen that the end of a particular field being admitted to a particular descriptor can be determined by counting the number of bits so admitted or a sub-multiple thereof. While the apparatus for effecting such a field bit count is described specifically in terms of the apparatus shown in FIGS. 4 and 5, it is to be understood that all other descriptors, such as 390, function in substantially the same way.

For convenience, each field of each record in file 100 is considered to have a predetermined number of characters, where each character consists of a fixed number of bits. It is the number of such characters in the field of each record selected for review in the FIGS. 4 and 5 descriptor that has been stored in character counter register 303 by the above-described manipulation of descriptor register 230 within unit 200. While the field termination is determined by character count in the preferred embodiment of this invention, it is to be understood that other forms of bit count determination can be used without departing from the spirit of this invention. In order to count the bits of a field as they are serially admitted to the FIGS. 4 and 5 descriptor, ring counter 317 is provided, the counter input being coupled to conductor 51 by the previously described gate 312 and delay unit 316. Counter 317 is selected to have a modulus equal to the number of bits in a character, and is effective to produce on its output conductor 334 a pulse each time a full count has been registered within counter 317 and the next succeeding impulse is applied to its input. Conductor 334 is coupled to the shift input of shift register 335. In this way, any 1 bit stored in one of the register 335 stages is advanced by the appearance of successive impulses on conductor 334 until it is produced on output conductor 336. The manner in which such a 1 bit is inserted into shift register 335 is next explained.

Returning to the consideration of character counter register 303, register 303 is like the above-described constant register 302 in that it includes a group of bistable elements having 1 inputs coupled to conductors 231 and corresponding output gates conditioned by the appropriate 1 outputs of those bistable elements. In manipulating descriptor register 230, the operator causes a pulse to be produced on the one of conductors 231 that represents the number of characters to be admitted to the FIGS. 4 and 5 descriptor. Accordingly, the appropriate one of the bistable elements of register 303 is shifted to its 1 state and thereby conditioned the corresponding one of the register 303 output gates. When a pulse appears on conductor 329 (and, as in the case of the descriptor of register 302, it is assumed for the present that such a pulse appears at an appropriate time) the conditioned one of the parallel-connected sample inputs of the register 303 output gates passes a pulse over one of output conductors 305 to the corresponding signal input of shift register 335. In other words, the appearance of a sampling impulse on conductor 329 causes the single digit word stored within register 303 to be non-destructively read out to the corresponding inputs of shift register 335 over one of conductors 305.

It is to be seen that such a bit read into a particular stage of shift register 335 is advanced through the various succeeding counter stages and ultimately is manifested as a pulse on conductor 336. From the above description, it is to be seen that the appearance of a pulse on conductor 336 signals the end of a field to be examined within the FIGS. 4 and 5 descriptor. The uses of this field-end pulse are next described.

Conductor 336 is coupled directly to compare circuit 503 for reasons to be explained presently and to the input of pulse amplifier 338. Pulse amplifier 338 is operative in the presence of a pulse applied to conductor 336 for producing impulses on its output conductor 337. Output conductor 337 is coupled directly to the 0 inputs of flip-flops 341 and 342, so that those flip-flops are shifted to their 0 states at this time. Conductor 337 also is coupled through OR circuit 333 to the 0 inputs of flip-flops 321 and 322, so that they also are shifted thereby to their 0 states (in anticipation of the next comparison operation) when a pulse is produced on conductor 337. Conductor 337 also is coupled to the reset inputs of shift registers 315 and 335. The pulse produced by amplifier 338 is of sufficient width to erase any 1's stored in those registers, so that registers 335 and 315 are cleared at this time in anticipation of the admission of bits belonging to the field of the next retrieved file unit 100 record into the FIGS. 4 and 5 descriptor.

The pulse on conductor 337 also is applied to the 0 input of flip-flop 309 which is therewith shifted to its 0 state and to the input delay unit 343. The pulse applied to the input of delay unit 343 is produced on the aforementioned output conductor 329, which is connected in the above-described manner to the sample inputs of the gates included in constant register 302 and character counter register 303, so words stored in those registers are non-destructively read out to newly-cleared shift registers 315 and 335 in anticipation of the appearance on conductor 61 of the bits from the next file unit 100 record field which are to be directed into the FIGS. 4 and 5 descriptor.

Shifting flip-flop 309 to its 0 state is effective for deconditioning gates 312 and 313. For this reason, the pulses of a record retrieved from file unit 100 and appearing at this time on conductor 61 as well as the synchronizing bit pulses on conductor 51 which are individual to the conductor 61 bits are blocked from passage into the FIGS. 4 and 5 descriptor. At this point, the FIGS. 4 and 5 descriptor is ready to receive the bits serially appearing on conductor 61 which are derived from the field within the next successive record of tape 11 within file unit 100 which is to be examined in the FIGS. 4 and 5 descriptor.

*Generating a signal to start criterion unit 400.*—As shown in FIG. 1, the various descriptors, such as 310–390 within unit 300 are arranged in a series. From the above description, it is to be seen that means within each such descriptor is effective for admitting a selected field or fields from each record read from file unit 100 to selected ones of those descriptors. Each descriptor includes the above-described comparing means for directively producing signals to indicate whether the value for the admitted fields is equal to, not equal to, greater than, or less than the value of the bits comprising a fixed word stored in the descriptor prior to the start of a search of file 100. In the above description, it has been shown that the comparing means output is coupled to test means for determining whether the relative values of each set of compare field bits and a fixed word meets a criterion also fixed for the descriptor in advance of the search of file 100. It has been shown that the descriptor including the last-mentioned test means is operative for selectively producing result signals (pulses) in accordance with the satisfaction or lack of satisfaction of the criterion established for the individual descriptor by the field bit admitted to that descriptor.

The last field or fields of records within file unit 100 to be examined are evaluated within the last descriptor, 390, in the aforementioned series. Upon the completion of such a field evaluation, it is desired to produce a signal to indicate that the review of the particular record has ended. Such signals are used within criterion unit 400 in the manner to be explained presently. To produce an end of record signal, conductor 336 within descriptor 390 (on which a pulse represented the end of the field admitted to that descriptor) is produced. Conductor 336 in the case of descriptor 390 only is coupled by jumper 511 to output terminal 512 and output conductor 513. Output conductor 513 is coupled to signal-utilizing apparatus within criterion unit 400 which is to be described later.

*Resetting the descriptor register.*—In order to change the fields admitted and the criteria established for the various descriptors, provision is made for first resetting the various registers, such as 301, 302, 303, and 501 within the descriptor shown in FIGS. 4 and 5. While it is to be realized that any of a number of methods can be used for effecting such setting and resetting operations, the preferred embodiment of the present invention includes providing the previously described, manually controlled setting apparatus and providing each of the aforesaid registers with a reset input to which conductor 271 is coupled. The appearance of a single pulse on conductor 271 and on such reset inputs is effective for restoring the bistable elements within the enumerated registers to 0 state, so that those elements within each such register can be selectively reset by further, selective manipulation of appropriate switches within the various groups to be found within decriptor register unit 200. In order to directly produce an impulse on conductor 271, there is provided in unit 270 manually operative switch 273. The closing of the contacts of that switch applies a significant level to the input of single shot 272 which in turn applies a pulse to output conductor 271.

*Criterion unit.*—Result signals produced by the various ones of the descriptors within unit 300 for each record reviewed by descriptor unit 300 are temporarily stored by means within criterion unit 400. It is the over-all purpose of unit 400 to examine the relationship among the criterion or result signals stored therein in terms of logical connectives among such results derived from signals which also have been stored for the duration of the search by means within unit 400. The means for storing signals representing logical connectives may be preserved indefinitely, so that uniform criteria may be applied to each record retrieved from file unit 100 throughout the conduct of a complete search of file unit 100. In the event that the multiple criteria for any record examined within descriptor unit 300 have been met, criterion unit 400 includes means for producing a "criterion-met" signal or pulse on its output conductor 420.

This "criteria-met" signal or pulse can be used in any of a number of ways. For instance, referring to FIG. 1, in the event that serially produced bits constituting a record retrieved from file 100 are stored within a register such as 500 as well as being directively admitted to the various descriptors within unit 300, it may be desirable to read to other apparatus (not shown) the record stored in register 500 which satisfies the multiple criteria within unit 400. Accordingly, the "criterion-met" signal produced by means to be described presently on conductor 420 is applied to the individual storage elements in a well-known manner within register 500 to cause those elements to produce bits on output conductors collectively indicated as 501. In the situation where the multiple criteria established within unit 400 are not satisfied by the record stored within register 500, criterion unit 400 fails to produce a "criteria-met" signal on conductor 420 allowing that record to be written over by the next record fetched from the file unit 100.

This particular apparatus for utilizing "criteria-met" signals is one of many applications and does not, per se, form a part of this invention. Therefore, a detailed description of the signal utilizing equipment is not included in the present description.

*Registering result signals.*—The result signals generated within each descriptor for each data record retrieved from file 100 described in previous sections are stored within a result register within criterion unit 400. The latter register includes a series of bistable elements, such as flip-flops 401–409, the number of such flip-flops being equal to the number of descriptors within unit 300. The 1 input of each result register flip-flop, such as 401, is individually connected to the result output, such as 508, of its individual descriptor unit. By means to be explained presently, each result register flip-flop has been reset to its 0 state prior to the time that the result signals derived from each record retrieved from file 100 and evaluated within descriptor unit 300 can be expected to issue from unit 300. For the present, however, it is assumed that such a resetting of the result register flip-flops has been achieved, and that result signals (or lack of them) for a particular record are being derived within unit 300 and stored within the elements of the result register.

With the above-described result register, it is to be seen that as a field or fields is evaluated within each of the unit 300 descriptors, the corresponding result register flip-flop is set to its 1 state in those cases where result signals have been generated (to indicate that the satisfaction of a criterion assigned to that descriptor by the field bits incoming to the descriptor). In the opposite case, where the field or fields examined within a particular descriptor fail to satisfy the criterion established for that descriptor, the corresponding result register flip-flop is allowed to remain in its 0 state. Thus, the flip-flops of the result register produce significant levels on their 0 and 1 outputs in accordance with the failure-to-satisfy or satisfaction-of-criteria condtions, respectively, established within the various descriptors in which fields of a file 100 record have been evaluated.

In order to establish necessary and sufficient relationships (expressed logically as AND and OR, respectively) among the results of the evaluation of an individual record stored within the result register, there is provided within criterion unit 400 a second, connector register comprising bistable elements such as flip-flops 411–419. The number of flip-flops in the connector register is equal to one less than the number of descriptors within unit 300. The connector register flip-flops are arrayed in interleaved relationship with respect to the flip-flops of the result register, so that each connector register flip-flop corresponds directly to two, next adjacent flip-flops within the result register.

Each flip-flop within the connector register is used to control a logical connective expressing gate which is arrayed between two result expressing gates, which in turn are controlled by appropriate next adjacent result register flip-flops interleaved with the last-mentioned connector register flip-flop. Referring to specific cases in FIG. 6, connector flip-flop 411 corresponds to result register flip-flops 401 and is considered to be interleaved between flip-flop 401 and the flip-flop in the result register next-adjacent flip-flop 401. Further, gate 423 which is controlled by flip-flop 419 is logically interposed between gates 421 and 422 (which are controlled by flip-flop 409) and similar gates controlled by the flip-flop next preceding 409 within the result register. The manner in which gates such as 423 achieve the aforementioned logical connective function is to be explained presently.

*Registering connective signals.*—Prior to the search of file unit 100 by the apparatus including the descriptors within unit 300, a predetermined group of logical connective signals are expressed within criterion unit 400. This is achieved by directively setting the various flip-flops within the connector register. Provision is made for resetting all connector flip-flops to 0 state by a pulse generated in the previously-described manner and applied to the 0 inputs of all connector register flip-flops over conductor 271. It is assumed that all such flip-flops are in 0 state prior to the time the next described setting operation is carried out.

In order to directively set flip-flops within the connector register, pulses are selectively applied to appropriate ones of conductors 251 by manually operating various switches within group 250 of descriptor register unit 200 prior to the initiation of a search within file unit 100. In substantially the same manner as that described in the case of switches within group 210 the manipulation of group 250 switches is effective for producing pulses on selected combinations of conductors 251. Individual ones of conductors 251 are connected to the 1 inputs of the various flip-flops 411 through 419 of the connector register, so that those flip-flops connected to a pulse bearing one of conductors 251 are shifted to their 1 state. Once set in the above-described manner, each flip-flop of the connector register remains in that state during a subsequent search of file unit 100.

It is the purpose of connector register flip-flops 411–419 to control gates, such as 423, which in deconditioned and conditioned states express AND and OR relationships, respectively, between the results expressed by signals or pulses issuing from next-adjacent pairs of gates, such as 421 and 422, the latter being controlled by next-adjacent ones of the result register flip-flops. To this end, the 0 output of each connector register flip-flop, such as 419, is coupled to the conditioning input of its individual gate, such as 423. Similarly, the conditioning inputs of gates 421 and 422 are connected to and controlled by significant levels on the 0 and 1 inputs, respectively, of its flip-flop, such as 409.

The gates, such as 421, 422, and 423, controlled by individual flip-flops of the result and connector registers, are arranged in a plurality of series. The gates controlled by the 1 outputs of the result register flip-flops such as 425 and 421 are arranged in one such series. Similarly, the gates such as 426 and 422 which are controlled by the 1 outputs of the result register flip-flops constitute another such series. The gates controlled by the 0 outputs of the flip-flops, such as 411 and 419 within the connector register constitute still another such series. The gates of the various series function as sources of pulses, each such source being operative when a significant level has been placed on its conditioning input by the corresponding register flip-flop and when a pulse is applied to its sample input in a manner yet to be described.

Pulses produced by the gates of the series including 426 and 422 represent the occurrence of a particular, independently occurring event; namely, the fact that criteria established in appropriate ones of the descriptors within unit 300 have been met by the field bits of a record admitted for evaluation purposes to those descriptors. Pulses produced by the gates of the series including 425 and 421 represent the occurrence of the negative counterpart of the events represented by pulses produced by gates 426 and 422; namely, the fact that criteria established in the appropriate ones of the descriptors within unit 300 have not been satisfied by field bits admitted to those descriptors. Pulses produced by the gates of the series including 424 and 423, represent an OR (i.e., sufficient) relationship and are used to interrelate the event-indicating signals produced by gates in the series including gates 426 and 422. The absence of such pulses on the outputs of the gates in the series including 424 and 423 represent an AND (i.e., necessary) condition by the adjacent ones of the gates in the series including 426 and 422. The apparatus for effecting this logical interrelationship is set forth in a subsequent section.

Having shown how the event and conditional relationship-indicating sources (i.e., the gates within the above-described series) are conditioned selectively to prepare them for producing output pulses in accordance with signals registered within the connector and result register, attention next is directed to apparatus including pulse sequencer 430 which is effective for causing the conditioned ones of those sources (gates) to operate. Pulse sequencer 430 is effective to supply pulses to the sample inputs of gates controlled by one of the result register flip-flops and thereafter to the gate controlled by the corresponding connector flip-flop in ripple sequence throughout each of the above-described series. To this end, pulse sequencer 430 is provided with a plurality of outputs 432–437 and is operative in response to the application of a pulse to input conductor 438 for providing a pulse on each of its output conductors in staggered time relationship, such an output pulse first appearing on conductor 432 and last appearing on conductor 437. The generation of each such sequence of output pulses constitutes a single operation of sequencer 430. The output pulses appearing on next adjacent ones of conductors 432–437 are regularly spaced apart in time from, and are not overlapping with, each other. The number of conductors 432–435 is equal to the combined number of flip-flops in the connector and result registers. In order to supply operating impulses to the gates of the aforementioned series, each of output conductors 432–435 is coupled to the sample input of the gate within those series in the following order: the first output conductor 432 is connected to gates 425 and 426 (i.e., the first gates in each of two of the above-described series) while the other of the first pair of output conductors, 433, is coupled to the sample input of gate 424 (i.e., the first gate in the remaining one of the series); the remainder of such pairs of output conductors 434–435 are connected in the order of occurrence to corresponding gates within the above-identified series.

With this relationship, it is to be seen that each time a pulse appears on conductor 438, pulse sequencer 430 is made operative to ripple through or scan the sample inputs of the various series of gates, applying the first pulse to the first gates of both series of event-indicating gates, such as 425 and 426, and next thereafter applying a pulse to the corresponding OR condition indicating gates, such as 424 within the series including gates 424–425. The last pair of sequencer 430 output conductors, 436 and 437, upon which pulses appear after each scan of the gates has been completed, are used as sources of pulses to indicate (1) a "criterion-met" situation within criterion unit 400 and (2) as a source of pulses to reset the flip-flops of the result register to 0 state in anticipation of the evaluation of the next record within unit 300 and the consequent receipt of a set of criterion signals from the descriptors within unit 300. Accordingly, output conductor 436 constitutes a source of signals to be coupled to apparatus (yet to be described) which is used for controlling the admission of pulses to output conductor 420. Conductor 437 is coupled to the 0 inputs of the result register flip-flops, so that the appearance of a pulse on conductor 437 is effective to reset to 0 state all result register flip-flops at the end of each operation of pulse sequencer 430.

Before leaving the description of sequencer 430, it is pointed out that pulses for application to input conductor 438 are transmitted from the last descriptor within unit 300 via conductor 513 and delay unit 431, so that pulse sequencer 430 and other apparatus within criterion unit 400 is started each time the evaluation of a record within unit 300 has been completed and the results of the evaluation of the various fields inserted in the flip-flops of unit 400 result register. Pulse sequencer 430 is effective for scanning the gates of the various series and applying pulses to conductors 436 and 437 between the time that a pulse appears on conductor 438 and the time of appearance of result signals from unit 300 which are derived from file unit 100 record next evaluated within unit 300.

*Utilizing condition-indicating and criterion signals.*—

Means comprising flip-flop 457 and gate 471 is provided within unit 400 for the purpose of controlling the admission of "criterion-met" signals from conductor 436 to output conductor 420. It is the purpose of means including flip-flop 451 to receive and temporarily store "criterion-not-met" signals from the sources including gates 425–421. To this end, the outputs of those gates are ORed together in circuit 455 and pulses therefrom are passed through OR circuit 456 to the 0 input of flip-flop 451, so that any "criterion-not-met" pulse shifts that flip-flop to its 0 state.

At the outset of operation of criterion unit 400, the start impulse on conductor 438 is passed through OR circuit 452 to the 1 input of flip-flop 451. Under these conditions, the first signals arriving at the inputs of flip-flop 451 from the condition and event indicating sources find that flip-flop set in its 1 state. Accordingly, gate 458, the conditioning input of which is connected to the 1 output of flip-flop 451, is prepared to pass impulses applied to its sample input at the outset of operation of unit 400.

Subsequent shifting of flip-flop 451 to its 0 state in response to the receipt of a "criterion-not-met" signal is effective for deconditioning gate 458 and for conditioning gate 454, the conditioning input of which is connected to the 0 output of flip-flop 451.

With the above-described configuration of apparatus, flip-flop 451 stores any "criterion-not-met" pulse (i.e., the flip-flop is placed in 0 state) until an OR relationship pulse or signal is received from one of the sources in the series including gates 424 through 423. To use such an OR pulse, the outputs of gates 424 through 423 are ORed together by circuit 453, and coupled to the sample inputs of gates 454 and 458. The arrival of such an OR condition-indicating pulse subsequent to the receipt of a "criterion-not-met" pulse finds flip-flop 451 in 0 state, gate 458 deconditioned, and gate 454 conditioned. Accordingly, the OR relationship pulse is passed through gate 454 to the 1 input of flip-flop 451 which is shifted to 1 state to indicate that a necessary relationship among the results yielded by descriptors just scanned and not satisfied bears an OR relationship to the descriptor or group of descriptors to be scanned next. Flip-flop 451 is maintained in 1 state in anticipation of the next occurring "criterion-not-met" pulse or the OR condition pulse. In the event a "criterion-not-met" pulse is next generated, flip-flop 451 is shifted back to its 0 state in the above-described manner. The case where an OR pulse is next generated is next described.

When such a pulse from OR circuit 453 is received and flip-flop 451 already is in the 1 state, it is to be seen that some descriptors already have been scanned and that none of these has conditioned one of the sources included in this series of gates 425–421 to produce a signal. Under these conditions, gate 458 is conditioned by the 1 output of flip-flop 451 and accordingly passes the pulse from OR circuit 453 to the 1 input of flip-flop 457, which therewith is shifted to its 1 state and conditions gate 471 to pass a pulse applied to its sample input.

The scanning operation of sequencer 430 continues in the above-described manner until all of the gates in the various series have been sampled. At the end of the scanning operation, flip-flop 457 in 0 and 1 states indicates the failure to satisfy and successful satisfaction, respectively, of multiple criteria within unit 400 by the record currently being evaluated within descriptor unit 300.

In the case where an AND relationship is specified between all next adjacent ones of the result register flip-flops, no OR condition-indicating pulse is transmitted through circuit 453 in the course of a scanning operation. To meet the requirements of this case when all criteria expressed within unit 400 have been met (i.e., flip-flop 451 is maintained steadily in 1 state to the end of the scanning operation) the pulse from source gate 422 (the last sampled of the series including 426 through 422) is passed through delay unit 462, OR circuit 453 and conditioned gate 458 to the 1 input of flip-flop 457. This pulse shifts flip-flop 457 to its 1 state to register the fact that preceding descriptors have satisfied the logical relationship among the results expressed in the result register by the various descriptors within unit 300.

From the preceding description, it is to be recalled that subsequent to the sampling of last gate 422 in its series, pulse sequencer 430 is effective for producing pulses on conductors 436 and later on conductor 437. The 436 conductor pulse is applied to the sample input of gate 471. From the description of the operation of flip-flop 457, it is to be seen that the sample pulse applied to gate 471 at a time when flip-flop 457 is in its 1 state is passed through gate 471 and OR circuit 472 to output conductor 420. The presence of a pulse on conductor 420 indicates that the multiple criteria for a particular record evaluated within descriptor unit 300 has been satisfied. Conversely, the situation where the arrival of a pulse at gate 471 during the time that gate 471 is deconditioned (owing to the fact that flip-flop 457 is in its 0 state) is blocked from passage through gate 471. The failure of a pulse to appear on conductor 420 indicates that the record evaluated within unit 300 has failed to satisfy the multiple criteria established in unit 400. Restated, the control means including flip-flop 457 and gate 471 is operative in accordance with the order of application of pulses or signals to the inputs of the means comprising flip-flop 451 and gate 454 to first and second conditions, and is effective in those conditions to block and admit pulses to output conductor 420.

The pulse appearing on conductor 436 also is passed through OR circuits 456 and 459 to the 0 inputs of flip-flops 451 and 457, respectively. In this way, those flip-flops are restored to 0 state at the conclusion of each scanning operation carried out within unit 400. The impulse on conductor 436 also is applied to the 0 and sample inputs of flip-flop 473 and gate 474, respectively, for purposes to be described presently. Criterion unit is ready to perform its next scanning operation.

From the above description, it is now apparent that the arrangement of elements within unit 400 which is included in the preferred embodiment of this invention, is such that the logical expression $$(A \cdot B \cdot C) + (D \cdot E \cdot F) + (G \cdot \text{etc.})$$

can be expressed. It is to be understood that other configurations of apparatus might be substituted for the one shown in criterion unit 400 in order to allow unit 400 to test the various "criterion," result signals yielded by descriptor unit 300 for different interrelationships. However, it is to be understood that the broad concept of evaluating particular fields within the various descriptors within unit 300 in combination with the evaluation of the results in logical form yielded by those descriptors in the same searching operation of file unit 100 has been established in the present invention.

*Testing for the satisfaction of M out of N criteria.*—
In addition to the above-described operation of testing for logical relationships among the results yielded by individual descriptors within unit 300, means is provided within unit 400 for producing a "criterion-met" signal on conductor 420 in the event it is desired to test each record evaluated in unit 300 for the satisfaction of M out of a total number of N criteria. The last-named means includes counter 475, flip-flop 473, and gate 474.

Counter 475 operates in a manner similar to the combination of constant register 302 and shift register 315 previously described. Like constant register 302, register 475 is set in advance of the search operation of file unit 100, by the manipulation of manually operable switches within group 260 of descriptor register unit 200. In the event that there are N descriptors within unit 300 and it is desired to retrieve any record in file 100 having M number of fields therein satisfying the criteria within a like number of descriptors of unit 300, the number M is set in counter 475, and a single bit is shifted into the M position of the part of the counter which corresponds to register 335. Counter 475 is repetitively operative during each scanning operation carried out in unit 400 for producing a pulse on its output conductor 476 in the event that M pulses have been applied to its pulse input 477 during the performance of that scanning operation. In order to count such "criterion-met" pulses, the outputs of event-indicating gates in the series 426–422 are ORed together by circuit 461 and applied to the shift input 477 of counter 475. If, during a scanning operation of unit 400, M or more pulses are received in counter 475 via OR circuit 461, counter 475 produces a single pulse on its output conductor 476. Output conductor 476 is coupled to the 1 input of flip-flop 473, so that a pulse on that conductor shifts flip-flop 473 from its normal 0 state to its 1 state. Flip-flop 473 in its 1 state is effective for conditioning gate 474, to which the 1 output is coupled.

In the manner previously explained, the sample input of gate 474 is coupled to conductor 436, so that a conductor 436 pulse finding gate 474 conditioned is passed through that gate and OR circuit 472 to output conductor 420. In the event that less than M descriptors have been satisfied, the conductor 436 pulse arriving at the sample input of gate 474 finds gate 472 in its normal, deconditioned state, so that it is blocked from passage to conductor 420.

Subsequent to the search of file unit 100, it may be necessary to reset counter 475 in anticipation of a search of different kinds of information. Consequently, counter 475 is provided with a reset input to which the previously described conductor 271 is connected. The appearance of a resetting pulse, which is produced in the manner previously described in connection with the description of the various registers and counters of the descriptor, on conductor 271, is effective for resetting the elements of counter 475 to their 0 state.

*Description of component circuits.*—In the above description of the preferred embodiment of the present invention, reference is made to the several registers, decoders, and the like employed therein. While all such devices are generally known and understood, for the convenience of the reader there is next provided brief descriptions of such devices.

Referring to FIG. 7, there is shown a multi-state flip-flop register having various pulse inputs collectively indicated as 701, which are directively and individually coupled to the 1 inputs of the various flip-flops such as those indicated collectively as 702. These flip-flops may be individually shifted from their normal 0 state to 1 state. In this manner, the flip-flops 702 are effective to produce significant levels on appropriate ones of the 0 and 1 outputs collectively indicated as 703 and 704, respectively. Subsequent to the use of such a register circuit, all flip-flops therein may be restored to 0 state upon the receipt of a pulse from reset conductor 705, which is directly coupled to the 0 input of each flip-flop in the register. A register of this general type can be used in the above-described connector and result registers of criterion unit 400 as well as test register 501 within the above-described descriptor.

Referring to FIG. 8, there is shown a gating circuit for producing impulses derived from a register circuit, such as the one shown in FIG. 7. Each 0 and 1 output of each element within such a register is directly coupled to the conditioning input of gates collectively indicated as 801A, 801B, etc. The sample inputs of such gates as 801A and 801B are connected in parallel to sample input 804. The application of a pulse to conductor 804 at the time that conditioning levels are being applied to conditioning inputs of the various gates is effective for causing the conditioned ones of the 801A gates to produce 0 condition-indicating pulses on appropriate ones of output conductors collectively indicated as 802; conditioned ones of the 801B gates to produce 1 condition-indicating pulses on appropriate ones of conductors collectively indicated as 803.

Referring to FIG. 9, there is shown a diagram of a core type shift register such as 335 employed within the descriptor. A series of cores, such as 901A, 901B, etc., is provided. Each of a plurality of input conductors 902A, 902B, etc., is individually coupled to an input winding of a particular core, so that the pulse applied thereto is effective for setting that core; i.e., driving the saturation in a first, aribitrary direction. Subsequent to the application of such pulses to selected ones of the cores 901A, 901B, etc., a series of time sequential pulses is applied to shift input conductor 903, the number of impulses being equal to the number of cores in the series. Shift input 903 is coupled in series to a shift winding on each of the cores 901A, 901B, etc., and a pulse applied thereto is effective for resetting the various cores, i.e., driving those cores into saturation in a direction opposite to the magnetization direction effected by the above-described setting input pulses. At this time, each of those cores which has been set by an input pulse is effective for producing a pulse on that core's output winding, such as 904A, 904B, etc., which is passed through a unidirectionally conductive device such as 905A, 905B, etc., to an input winding of the next successive core in the series. Such shifted pulses are effective for setting the next successive core. As shift pulses continue to be received on conductor 903, it is to be seen that a series of time sequential pulses is taken from the output 906 which is coupled to the output winding of the last core in the series. Such output pulses correspond to the input pulse on the various ones of input conductors 902A, 902B, etc., and each is in substantial time coincidence with the appropriate shift impulse applied to conductor 903.

Referring to FIG. 10, there is shown a core type sequential pulse generator, which may be used in an application such as the one described above in the case of pulse sequencer 430 within criterion unit 400. A series of cores 1001A, 1001B, etc., is provided. A single pulse on input conductor 1002, which is directly coupled to the pulse input of first core 1001A in the series is shifted from that core into each of the other, succeeding cores of the series upon the application of time sequential shift pulses from conductor 1006 to the series-connected reset windings, such as 1003A, 1003B, etc., through means including unidirectively conductive device such as 1004A for connecting the output of the first and intermediate stage cores to the input of the next-adjacent core of the series. With this arrangement, it is to be seen that application of a single pulse to input conductor 1002 and subsequent application of pulses to conductor 1006 is effective to cause a single impulse to be generated on each of the core outputs 1005A, 1005B, etc., in the order of the occurrence of those output conductors from left to right.

Figure 11:
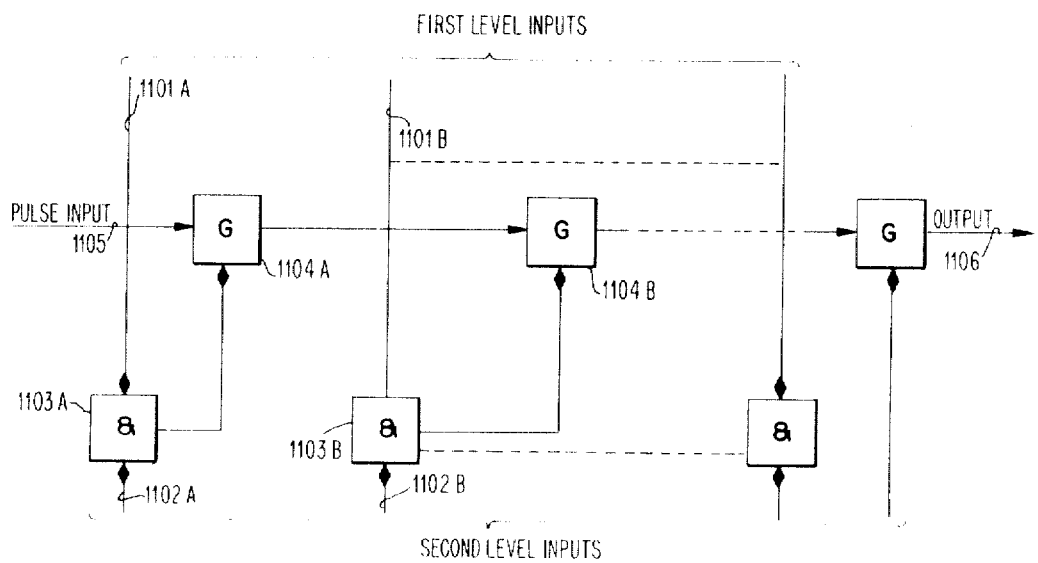
FIG. 11 shows in logic schematic form a compare circuit.

Referring to FIG. 11, there is shown a decoder suitable for such uses as the one in compare circuit 307 of the descriptor. First and second sets of input conductors are connected to first and second inputs of various AND circuits 1103A, 1103B, etc. The application of significant levels to selected combinations of the first level input conductors 1101A, 1101B, etc., and to selected combinations of the second level input conductors 1102A, 1102B, etc., is effective to cause those AND circuits having significant levels on both inputs to produce significant output levels. Accordingly, the significant output levels from the operative ones of AND circuits 1103A, 1103B, etc., are effective for conditioning the appropriate ones of 1104A, 1104B, etc. The last-named gates are serially arranged with the 1 input of the first coupled to the sample input of the next succeeding gate. With this arrangement and the application of an impulse to pulse input conductor 1105 during the time that matching sets of first and second level inputs are present, all gates in the series are conditioned and the input pulse is passed through those gates to output conductor 1106.

Figure 12:
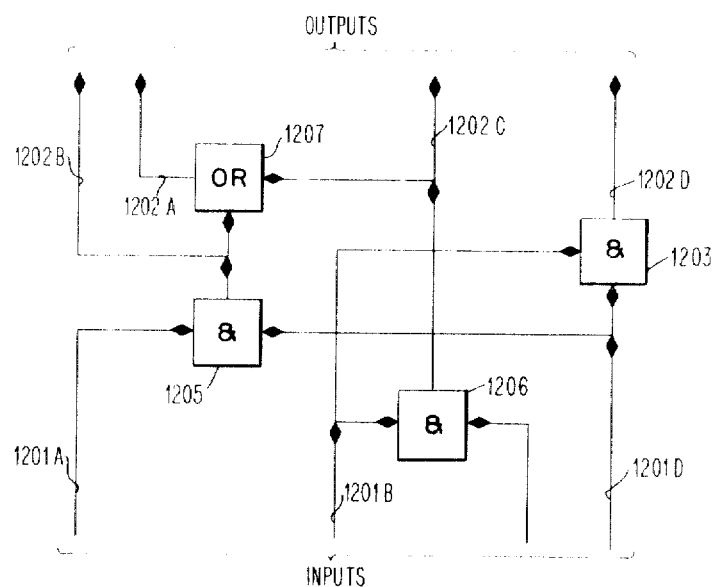
FIG. 12 shows in logic schematic form a decoder.

Referring to FIG. 12, there is shown a decoding circuit having inputs indicated as 1201A, 1201B, 1201C, and 1201D and outputs indicated as 1202A, 1202B, 1202C, and 1202D. Such a decoder may be used in a case such as the one shown for decoder 502 within the descriptor. The application of significant levels to the following pairs of input conductors 1201B and 1201D; 1201B and 1201C; and 1201A and 1201D; is to be effective for producing significant output levels on conductors 1202D, 1202C, and 1202B, respectively. Further, the production of a significant level on either of conductors 1202B and 1202C is to coincide with the production of a significant level on output conductor 1202D. To this end, input conductors 1201D and 1201B are connected to the inputs of AND circuits 1203, and input conductors 1201B and 1201C are connected to the inputs of AND circuit 1206; and input conductors 1201A and 1201D are connected to the inputs of AND circuit 1205. Further, output conductors 1202B and 1202C also are connected to the inputs of OR circuit 1207, so that the production of a significant level on either of conductors 1202B and 1202C is passed to output conductor 1202A.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data handling system, file means for sequentially producing records of like format in the form of time sequential bits which are grouped into successive fields, a device for utilizing the bits of one or more particular, consecutive fields within each record produced by said file means, gating means coupled to said file means and to said device operative to deconditioned and conditioned states for blocking and admitting, respectively, the passage of bits from said file means to said device, comparing means coupled to said file means and to said gating means operative upon the receipt from said file means of a first predetermined number of bits within each record means for conditioning said gating means, counting means coupled to said gating means operative upon the admission to said device of bits which represent the field or fields of each record to be used by said device for deconditioning said gating means, and setting apparatus including first means for selectably making said comparing means responsive to the occurrence of a first particular number of fields in each record produced by said file means and second means for selectably making said counting means responsive to the occurrence of a number of bits equal to the number of bits within the field or fields to be admitted to said device, whereby any field or consecutive fields of each record produced by said file means can be admitted to said device.

2. The system set forth in claim 1 and having in addition within said device register means repetitively operative for producing a plurality of bits, and second comparing means coupled to said gating means in parallel with said counting means and coupled to said register means, said second comparing means being operative for evaluating bits admitted to said device with respect to bits produced by said register means.

3. The system set forth in claim 2 wherein said setting apparatus includes additional means operative for inserting a particular combination of bits in said register means, whereby record fields admitted to said device are evaluated in terms of a word stored in said register means which may be inserted in said register means prior to the operation of said file means.

4. The system set forth in claim 2 wherein said register means includes apparatus for storing the bits of a fixed word, shifting means coupled to said storing apparatus and also coupled to and controlled by said gating means for repetitively and non-destructively deriving bits corresponding to the bits stored in said register means, and wherein said second comparing means also is coupled to said shifting means and is operative for evaluating bits admitted to said device with respect to bits produced by said shifting means, whereby the bits of any field or fields of each record admitted to said device are evaluated in terms of bits stored in said register means.

5. The system set forth in claim 4 wherein said setting means includes additional means coupled to and operative for inserting a particular combination of bits in said storing means, whereby record fields admitted to said device are evaluated in terms of a word which may be inserted in said storing apparatus prior to the operation of said file.

6. In a data handling system, file means for sequentially producing records of like format in the form of time sequential bits which are grouped into successive fields, a device for utilizing the bits of one or more particular, consecutive fields within each record produced by said file means, gating means coupled to said file means and to said device operative to deconditioned and conditioned states for blocking and admitting, respectively, the passage of bits from said file means to said device, comparing means coupled to said file means and to said gating means operative upon the receipt from said file means of a first predetermined number of fields within each record for conditioning said gating means, counting means coupled to said gating means operative upon the admission to said device of bits which represent the field or fields of each record to be used by said device for deconditioning said gating means, register means repetitively operative for producing a plurality of bits, and second comparing means coupled to said gating means in parallel with said counting means and additionally coupled to said register means operative for producing on an output thereof signals in accordance with the value of a record field or fields admitted to said device relative to bits produced by said register means.

7. The system set forth in claim 6 and having in addition means for producing signals representing a criterion established for said device, and result means coupled to said second comparing means output and to said criterion means operative for producing a binary result signal characterizing each record retrieved from said file in terms of a word stored in said register means and criterion means signals.

8. The system set forth in claim 7 wherein said file means is effective for producing the bits of each record field in order of descending significance, said register means includes apparatus coupled to said gating means effective to make said register means operative to produce bits derived therefrom substantially in synchronism with the admission of bits to said device, and said second comparing means is operative for comparing each bit admitted to said device to the corresponding bit produced by said register means.

9. The system set forth in claim 8 and having in addition within setting apparatus first means operative for making said first comparing means responsive to the occurrence of a first particular number of bits, second means for making said counting means responsive to the admission to said device of a number of bits equal to the number of bits in the field or fields to be admitted to said device, third means operative for inserting a particular combination of bits in said register, and fourth means for operating said criterion means whereby the field or fields of a record admitted to said device are evaluated in terms of a word inserted in said register means and in accordance with a criterion established for said device prior to the operation of said file means.

10. The system set forth in claim 8 wherein said result means includes an input coupled to said counting means in parallel with said gating means, and said counting means also is effective for making said register means operate substantially in synchronism with the deconditioning of said gating means.

11. In a data retrieval system, file means for sequentially producing like-format records consisting of bits grouped into discrete fields, a plurality of descriptors, gating means effective for controlling the admission of field bits to each of said descriptors from said file means, means for causing said gating means to admit a particular field or particular fields of each record produced by said file means to any of said descriptors, and evaluating means within each of said descriptors operative from field bits of each record admitted thereto for producing a result signal in accordance with a criterion established for that one of said descriptors, whereby a record retrieved from said file means is characterized by a group of such result signals derived from particular fields or combinations of particular fields in that record.

12. In a data retrieval system, file means for sequentially producing records of like format represented by bits in time sequence which are grouped into a plurality of fields, a plurality of descriptors, means within each of said descriptors operative for evaluating a field or fields of each record admitted thereto, a plurality of gating means, each of said gating means being individual to one of said descriptors and effective for coupling said file means thereto, each of said gating means operative to deconditioned and conditioned states for blocking and admitting, respectively, the passage of bits therethrough, means operative for conditioning each of said gate means at the beginnings of the fields or fields within each record to be evaluated within the said descriptors associated therewith, and means operative in responsive to the admission to each of said descriptors of the number of bits within the record field or fields to be evaluated for deconditioning the one of said gating means individual to that one of said descriptors.

13. In a data retrieval system, file means for sequentially producing records of like format in the form of time sequential bits which are grouped into successive fields of bits, a plurality of descriptors, means within each of said descriptors for evaluating the bits of one or more fields within each record produced by said file means, a plurality of gating means, each of said gating means being individual to a particular one of said descriptors and effective for coupling said file means to said evaluating means of that one of said descriptors, each of said gating means being operable to deconditioned and conditioned states for blocking and admitting, respectively, passage of record bits therethrough, a plurality of comparing means each individual to one of said descriptors and coupled to said file means, each of said comparing means being operative upon the occurrence of the beginning of the field or fields of each record produced by said file means which are to be admitted to that descriptor for placing the one of said gating means individual to that descriptor in conditioned state, and counting means within each of said descriptors coupled to the one of said gating means individual to that one of said descriptors operative upon the admission of all bits of the record field or fields to be evaluated within, that one of said descriptors for placing the one of said gating means individual to that one of said descriptors in its deconditioned state.

14. The system set forth in claim 13 wherein each of said descriptors also includes register means coupled to said evaluating means of that descriptor repetitively operative for producing a particular combination of bits for use in said evaluating means, and said evaluating means within each of said descriptors is operative to compare the bits of the field or fields of each record admitted thereto to the bits produced by said register means thereof.

15. The system set forth in claim 13 wherein each of said descriptors includes register means coupled to said evaluating means of that descriptor repetitively operative for producing sets of bits, and criterion means coupled to said evaluating means of that descriptor, said evaluating means within each of said descriptors being effective for comparing record field bits admitted thereto to bits produced by said registering means and therewith responsive to the operation of said criterion means for producing binary signals characterizing the fields of each record evaluated in terms of a criterion established for that one of said descriptors.

16. The system set forth in claim 15 wherein each said comparing means of each said descriptor is settable to become operative upon the receipt of a particular number of bits, said counting means of each said descriptor is settable to become operative upon the admission thereto of a particular number of bits, said register means is settable to repetitively produce a particular combination of bits, and said criterion means is settable to cause said evaluating means to effect selectively one of a number of logical tests on each field or set of fields evaluated therein, and having in addition means common to said descriptors for setting said comparing means, said counting means, said register means, and said criterion means within each of said descriptors.

17. In a data retrieval system, file means for sequentially producing like format records consisting of bits grouped into discrete fields, a plurality of descriptors, gating means effective for controlling the admission of field bits to each of said descriptors from said file means, first control means for selectively causing said gating means to admit a particular field or particular fields of each record produced by said file means to any of said descriptors, evaluating means within each of said descriptors operative from field bits of each record admitted hereto for producing a result signal in accordance with a criterion established for that one of said descriptors, and criterion means coupled to said evaluating means of all said descriptors operative for testing the result signals derived from each record for the satisfaction of an established, logical interrelationship among such result signals, whereby each record retrieved from said file means may be evaluated in accordance with the contents of particular fields or combinations of particular fields in such a record in a single pass through said system.

18. The system set forth in claim 17 wherein said criterion means includes first signal sources individually controlled by and operative in responsive to result signals produced by said evaluating means of the various said descriptors for temporarily storing each set of result signals derived from a single record, second signal sources operative for producing a set of signals representing logical interrelationships between the various ones of said descriptor result signals, and second control means coupled to said first and said second sources operative subsequent to the operation of said descriptors for testing signals produced by said first sources for the satisfaction of various criteria expressed in terms of logical connective signals produced by said second series sources.

19. The system set forth in claim 18 wherein said criterion means also includes output means operative in response to the operation of said second control means for producing a binary signal in accordance with satisfaction or lack of satisfaction of multiple criteria by the evaluated fields of each record produced by said file means.

20. The system set forth in claim 19 wherein said output means includes a signal generator and a system output, and wherein said second control means is operative to deconditioned and conditioned states by said first and said second signal sources for blocking and admitting, respectively, the passage of signals therethrough.

21. The system set forth in claim 20 and having in addition setting means operative for individually directing said first control means and said evaluating means individual to each of said descriptors, and for further directively conditioning said second signal sources within said criterion means, whereby each record retrieved from said file is evaluated in accordance with the contents of particular fields or combinations of particular fields in such records, and the criteria established for each such record may be established prior to the operation of said file means.

22. The system set forth in claim 21 and having in addition scanning means effective subsequent to the operation of said descriptors for making operative in fixed order each of said first and said second signal sources, and wherein said second control means includes first and second inputs coupled to said first and said second sources, respectively, and is operative in responsive to the order in which signals from said sources are applied for conditioning and deconditioning said second control means.

23. In a data evaluating system, a generator for producing a signal, a first and a second series of signal sources each of said sources having an input and an output and being conditionable to produce a signal on said output thereof upon the application of a signal to said input thereof, first means and second means for independently conditioning each of said sources of said first and said second series, respectively, scanning means having a first group of outputs individually coupled to said source inputs operative for applying in ripple sequence a signal first to said input of ones of said first series sources and then a signal to said input of the ones of said second series sources throughout the lengths of said series, said scanning means also having next-to-last and last outputs and being operative for producing signals in sequence thereon subsequent to the production of signals for application to said sources, a system output for delivering signals from said next-to-last scanning means outputs, control means coupled between said generator and said system output operable between conditioned and deconditioned states for admitting and blocking, respectively, the passage of signals therethrough, and storing means having first and second inputs coupled to said outputs of said first and said second series sources, respectively, operative in accordance with a predetermined order of receipt of signals from said first and said second sources for conditioning said control means, whereby independently conditioning and deconditioning said first series sources in accordance with binary representations of a like number of independently occurring events allows a signal to be delivered to said system output upon the satisfaction of multiple criteria among those events expressed in terms of the conditioning and deconditioning of said second series sources.

24. The system set forth in claim 23 and having in addition means effective prior to the operation of said scanning means for placing said control means in deconditioned state.

25. In a data evaluating system, a generator for producing a signal, a system output for delivering signals from said generator, control means coupled between said generator and said system output, said control means having a conditioning input and being operative in response to the application of a signal thereto for admitting the passage of signals between said generator and said system output, storing means including a flip-flop having 0 and 1 inputs operative in response to the application of a signal thereto for producing signals on 0 and 1 outputs, respectively, a first series of sources conditionable for producing signals forming binary representations of the occurrence of a plurality of events, means for coupling said first series sources to said 0 input of said flip-flop, a second series of sources conditionable for producing binary signals representing logical OR conditions, means for independently conditioning any of said first and said second series sources, scanning means operative for sampling each of said sources throughout the lengths of the said series of sources and effective for causing conditioned ones of said sources to produce signals, said storing mean also including first and second gates having conditioning inputs coupled to said 0 and said 1 outputs of said flip-flop, respectively, and being operative in response to the application of signals thereto for admitting the passage of signals from any of said second series sources to said flip-flop 1 input and to said control means input, respectively, whereby a signal from said generator is admitted to said output in the event two successive second series signals are produced without the production of an intervening signal from one of said first series sources in the course of a single operation of said scanning means.

26. The system set forth in claim 25 wherein said first and said second series source conditioning means include first and second registers, each of said first and said second registers having a plurality of element with outputs therof coupled to individual ones of said first and said second series, and having in addition means repetitvely operative for selectively setting the various ones of said first register elements in accordance with a set of determined events, means operative prior to the operation of said first register setting means for setting said second register elements in accordance with a set of fixed logical connectives, and means operative in response to each operation of said first register setting means for operating said scanning means.

27. The system set forth in claim 25 wherein said control means includes a second flip-flop having 0 and 1 inputs, and said control means input comprises said 1 input of said second flip-flop, said control means further including a gate having a conditioning input coupled to the 1 output of said second flip-flop and being operative in response to the receipt thereon of a signal for passing impulses from said generator to said system output.

28. The system set forth in claim 27 and having in addition means for coupling said generator to the 0 input of said second flip-flop in order to restore said control means flip-flop to 0 state subsequent to each operation of said scanning means.

29. In a data evaluating system, a generator repetitively operative for producing signals, a system output for delivering signals from said generator, control means coupled between said generator and said system output having a conditioning input and being operative in response to the application of a signal thereto for admitting the passage of signals between said generator and said system output, storing means having a bistable element with first and second inputs and first and second outputs, said element being operative in response to the application of signals to said first and said second inputs thereof for producing signals on said first and said second outputs thereof, a first and second series of signal sources, each of said sources having a conditioning and sample input and being operative in response to the application of coincident signals thereto for producing a signal on said source output, scanning means operative for applying signals to said sample inputs of the various ones of said sources in ripple sequence throughout the lengths of the said series in order to cause conditioned ones of said sources to produce signals, means for connecting each of said first series source output to said first storing means element input, said storing means further including first and second gates having conditioning inputs coupled to said first and said second outputs, respectively, of said storing means element, each of said gates being effective in response to the application of a signal to said conditioning input thereof for passing signals therethrough, means including said first gate for coupling said second series source outputs to said storing means element second input, means including said second gate for coupling said second series sources outputs to said control means first input, a first register for conditioning the various ones of said sources in said first series, a second register for conditioning the various ones of said sources in said second series, each of said register elements having an input and being operable in response to the application of a signal thereto for generating a signal on an output thereof, said first register outputs being individually coupled to said conditioning inputs of said first series sources, said second register element outputs being individually coupled to said conditioning inputs of second series sources, a plurality of descriptors individually coupled to the various ones of said first register element inputs for operating the elements of said first register in accordance with the occurrence of a series of independently occurring events, and a second plurality of means coupled to the individual ones of said second register element inputs operative prior to the operation of said descriptors for independently and selectively producing signals representing logical OR relationships.

30. The system set forth in claim 29 and having in addition start means operative subsequent to the operation of all said descriptors for operating said scanning means.

31. The system set forth in claim 30 for coupling said start means to said storing means element second input.

No references cited.

ROBERT C. BAILEY, *Primary Examiner.*

P. J. HENON, *Assistant Examiner.*